(12) United States Patent
Sato et al.

(10) Patent No.: US 9,502,071 B2
(45) Date of Patent: Nov. 22, 2016

(54) SPINDLE MOTOR AND DISK DRIVE APPARATUS

(71) Applicant: Nidec Corporation, Kyoto (JP)

(72) Inventors: Kazuhiro Sato, Kyoto (JP); Masahiro Shiraishi, Kyoto (JP); Takayuki Ishino, Kyoto (JP); Akihiro Yudate, Kyoto (JP); Takuro Matsumoto, Kyoto (JP); Toshihiro Akiyama, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 170 days.

(21) Appl. No.: 14/607,375

(22) Filed: Jan. 28, 2015

(65) Prior Publication Data

US 2015/0138670 A1      May 21, 2015

Related U.S. Application Data

(63) Continuation-in-part of application No. 14/169,511, filed on Jan. 31, 2014, which is a continuation-in-part of application No. 13/780,447, filed on Feb. 28, 2013.

(60) Provisional application No. 61/680,817, filed on Aug. 8, 2012.

(30) Foreign Application Priority Data

Aug. 7, 2012   (JP) ................................. 2012-174570

(51) Int. Cl.
| | |
|---|---|
| H02K 5/22 | (2006.01) |
| H02K 3/50 | (2006.01) |
| G11B 19/20 | (2006.01) |

(52) U.S. Cl.
CPC ............ *G11B 19/2009* (2013.01); *H02K 3/50* (2013.01); *H02K 5/225* (2013.01); *H02K 2203/06* (2013.01); *H02K 2211/03* (2013.01)

(58) Field of Classification Search
CPC .......... H02K 3/50; H02K 5/22; H02K 5/225; H02K 2211/03; G11B 19/2009
USPC ........................................ 310/71; 360/99.08
See application file for complete search history.

(56) References Cited

U.S. PATENT DOCUMENTS

| | | | |
|---|---|---|---|
| 2006/0138886 A1* | 6/2006 | Ito ........................... | H02K 3/522 |
| | | | 310/89 |
| 2007/0034326 A1 | 2/2007 | Kikuchi et al. | |
| 2011/0122530 A1* | 5/2011 | Sekii ........................ | H02K 3/50 |
| | | | 360/99.08 |

FOREIGN PATENT DOCUMENTS

JP           2011-114892 A       6/2011

OTHER PUBLICATIONS

Sato et al., "Spindle Motor and Disk Drive Apparatus", U.S. Appl. No. 13/780,447, filed Feb. 28, 2013.
Sato et al., "Spindle Motor and Disk Drive Apparatus", U.S. Appl. No. 14/169,511, filed Jan. 31, 2014.

* cited by examiner

*Primary Examiner* — Thomas Truong
(74) *Attorney, Agent, or Firm* — Keating & Bennett, LLP

(57) ABSTRACT

A base member includes a base through-hole which interconnects an upper opening and a lower opening. An insulating sheet portion is disposed at a lower surface side of the base member. The insulating sheet portion covers at least a portion of the lower opening. Lead wires extending from coils extend to the lower surface side of the base member through the base through-hole. The lead wires extend radially outward along a lower surface of the insulating sheet portion while making contact with the insulating sheet portion. The lead wires are soldered to land portions of a circuit substrate. The lower opening is covered with a sealing material. The circuit substrate includes a first region. The insulating sheet portion is defined by a smaller number of layers than the first region.

19 Claims, 22 Drawing Sheets

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

A hard disk device or an optical disk device is typically equipped with a spindle motor for rotating a disk. The spindle motor includes a stationary unit fixed to a housing of a device and a rotary unit rotating together with a disk supported thereon. In the spindle motor, torque acting about a center axis is generated by magnetic fluxes generated between the stationary unit and the rotary unit, whereby the rotary unit is rotated with respect to the stationary unit.

A conventional spindle motor is disclosed in, e.g., Japanese Patent Application Publication No. 2011-114892. The spindle motor disclosed in the above-cited reference includes a base member, coils and a circuit substrate. Lead wires extending from the coils extend via through-holes of the base member and are connected to the circuit substrate (see claim 1 of Japanese Patent Application Publication No. 2011-114892).

In this spindle motor, there is a need to electrically insulate the lead wires led out from the coils and the base member. Particularly, the spindle motor is becoming thinner and thinner in recent years. Consequently, the diameter of the lead wires making up the coils tends to become smaller. For that reason, if the lead wires having a small diameter make contact with the base member, there is a fear that the lead wires may be damaged by a light contact. Thus, it is desirable to prevent the lead wires and the base member from making contact with each other even under a tensioned state.

However, if an insulation body is merely interposed between the lead wires and the base member, the dimension of the spindle motor is increased by the insulation body. Particularly, the through-holes of the base member are covered with a sealing material such as an adhesive agent or the like. It is not easy to dispose the insulation body between the lead wires and the base member and to reduce the dimension of the spindle motor, while securing the thickness necessary for the rigidity of the base member and the thickness of the sealing material necessary for the sealing of the hard disk device.

SUMMARY OF THE INVENTION

A spindle motor according to a first aspect of various preferred embodiments of the present invention includes a stationary unit, and a rotary unit rotatably supported so as to rotate about a center axis extending up and down. The stationary unit includes a metal base member, an armature positioned above the base member, and a circuit substrate. The circuit substrate is positioned on a lower surface of the base member and is electrically connected to coils of the armature. The rotary unit includes a magnet configured to generate torque between the magnet and the armature.

The base member includes a base through-hole. The base through-hole is configured to interconnect an upper opening defined at an upper surface side of the base member and a lower opening defined at a lower surface side of the base member. An insulating sheet portion is disposed at the lower surface side of the base member. The insulating sheet portion is different and separate from the circuit substrate or a portion of the circuit substrate.

The insulating sheet portion covers at least a portion of the lower opening of the base through-hole. Lead wires extending from the coils extend toward the lower surface side of the base member through the base through-hole. The lead wires extend radially outward along a lower surface of the insulating sheet portion while making contact with the insulating sheet portion. The lead wires are soldered to land portions of the circuit substrate.

The stationary unit further includes a sealing material that covers the lower opening of the base through-hole. The circuit substrate includes a first region defined by a plurality of layers axially laminated one above another. The insulating sheet portion is defined by a smaller number of layers than the first region.

According to the first aspect of various preferred embodiments of the present disclosure, it is possible to reduce the dimension of the spindle motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, illustrative preferred embodiments of the present invention will now be described with reference to the drawings. In the subject application, the direction parallel to the center axis of a spindle motor will be referred to as "axial". The direction orthogonal to the center axis of the spindle motor will be referred to as "radial". The direction extending along an arc about the center axis of the spindle motor will be referred to as "circumferential". In the subject application, the shape and positional relationship of individual components will be described under the assumption that the axial direction is an up-down direction and further that the side of an armature with respect to a base member is an upper side. However, such definition of the up-down direction is not intended to limit the in-use direction of the spindle motor and the disk drive apparatus according to the present invention.

In the subject application, the term "parallel" includes the term "substantially parallel". The term "orthogonal" includes the term "substantially orthogonal".

Figure 1:
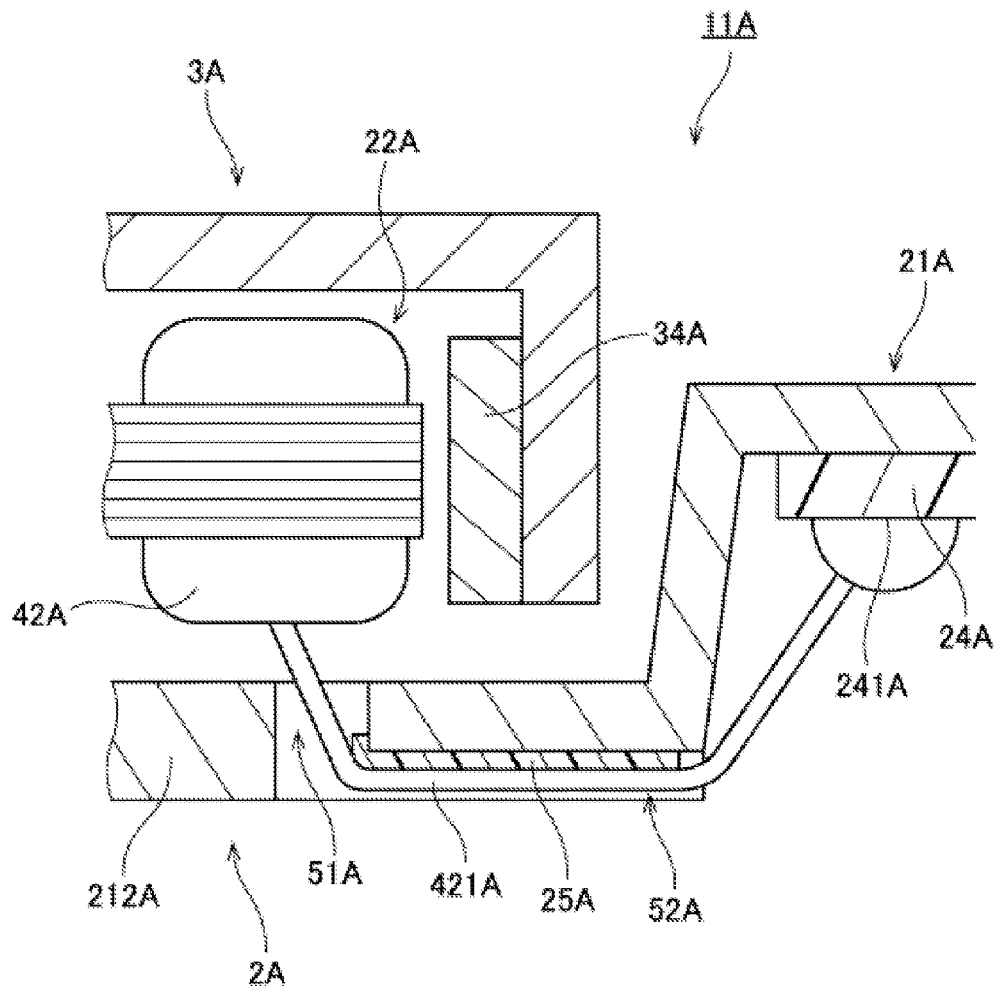
FIG. 1 is a partial vertical sectional view of a spindle motor according to a first preferred embodiment of the present invention.

FIG. 1 is a partial vertical sectional view of a spindle motor 11A according to a first preferred embodiment of the present invention. As shown in FIG. 1, the spindle motor 11A includes a stationary unit 2A and a rotary unit 3A.

The stationary unit 2A preferably includes a base member 21A, an armature 22A, and a circuit substrate 24A. The base member 21A preferably is made of metal. The base member 21A may be made of a material such as, e.g., an aluminum alloy, a ferromagnetic or non-magnetic stainless steel, a magnesium alloy, etc. The armature 22A is positioned above the base member 21A. The circuit substrate 24A is arranged on the lower surface of the base member 21A. The circuit substrate 24A is electrically connected to the coils 42A of the armature 22A.

The rotary unit 3A is supported to rotate about a center axis extending up and down. The rotary unit 3A includes a magnet 34A. During the operation of the spindle motor 11A, torque is generated by the magnetic fluxes generated between the armature 22A and the magnet 34A.

As shown in FIG. 1, the base member 21A preferably includes a bottom portion 212A, a base through-hole 51A, and a base groove portion 52A. The bottom portion 212A is positioned below the armature 22A and extends in a ring shape. The base through-hole 51A axially extends through the bottom portion 212A. The base groove portion 52A is arranged on the lower surface of the base member 21A. The base groove portion 52A extends radially outward from the lower end portion of the base through-hole 51A.

A first insulating sheet portion 25A is preferably fixed to the bottom surface of the base groove portion 52A by, for example, an adhesive agent or a sticky material. The thickness of the first insulating sheet portion 25A is preferably smaller than the thickness of a land portion 241A of the circuit substrate 24A. Furthermore, a portion of the first insulating sheet portion 25A overlaps with a lower opening of the base through-hole 51A when seen in a plan view.

A lead wire 421A extending from each of the coils 42A is led into the base groove portion 52A via the base through-hole 51A. Moreover, the lead wire 421A extends radially outward along the lower surface of the first insulating sheet portion 25A. The lead wire 421A is soldered to the land portion 241A of the circuit substrate 24A at the radial outer side of the bottom portion 212A. For that reason, the contact between the lead wire 421A and the base member 21A is prevented by the first insulating sheet portion 25A. Accordingly, the lead wire 421A and the base member 21A are electrically insulated from each other.

Figure 2:
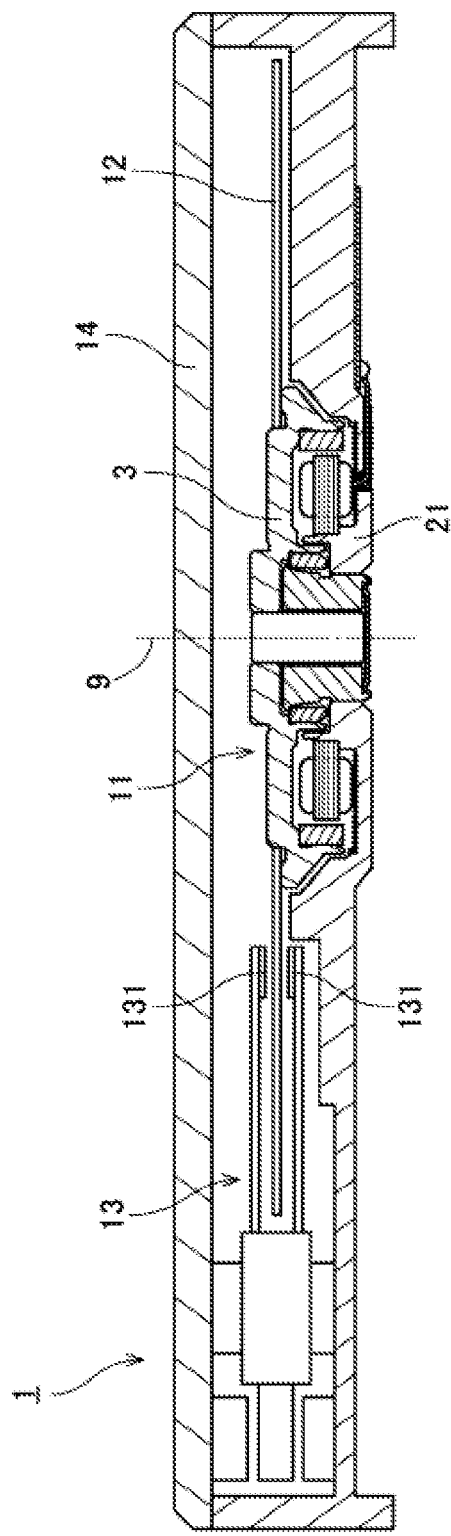
FIG. 2 is a vertical sectional view of a disk drive apparatus according to a second preferred embodiment of the present invention.

FIG. 2 is a vertical sectional view of a disk drive apparatus 1 according to a second preferred embodiment of the present invention. The disk drive apparatus 1 is preferably an apparatus for rotating, e.g., a magnetic disk 12, and performing information reading and writing tasks with respect to the magnetic disk 12. As shown in FIG. 2, the disk drive apparatus 1 preferably includes a spindle motor 11, a magnetic disk 12, an access unit 13, and a cover 14.

The spindle motor 11 supports the magnetic disk 12 and rotates the magnetic disk 12 about a center axis 9. The spindle motor 11 includes a base member 21 extending in a direction orthogonal to the center axis 9. The upper region of the base member 21 is covered with the cover 14. The rotary unit 3 of the spindle motor 11, the magnetic disk 12, and the access unit 13 are accommodated within a housing defined by the base member 21 and the cover 14. The access unit 13 is arranged to move a head 131 along the recording surface of the magnetic disk 12 and to perform information reading and writing tasks with respect to the magnetic disk 12.

The disk drive apparatus 1 may include two or more magnetic disks 12. Furthermore, the access unit 13 may perform only one of the information reading and writing tasks with respect to the magnetic disk 12.

Figure 3:
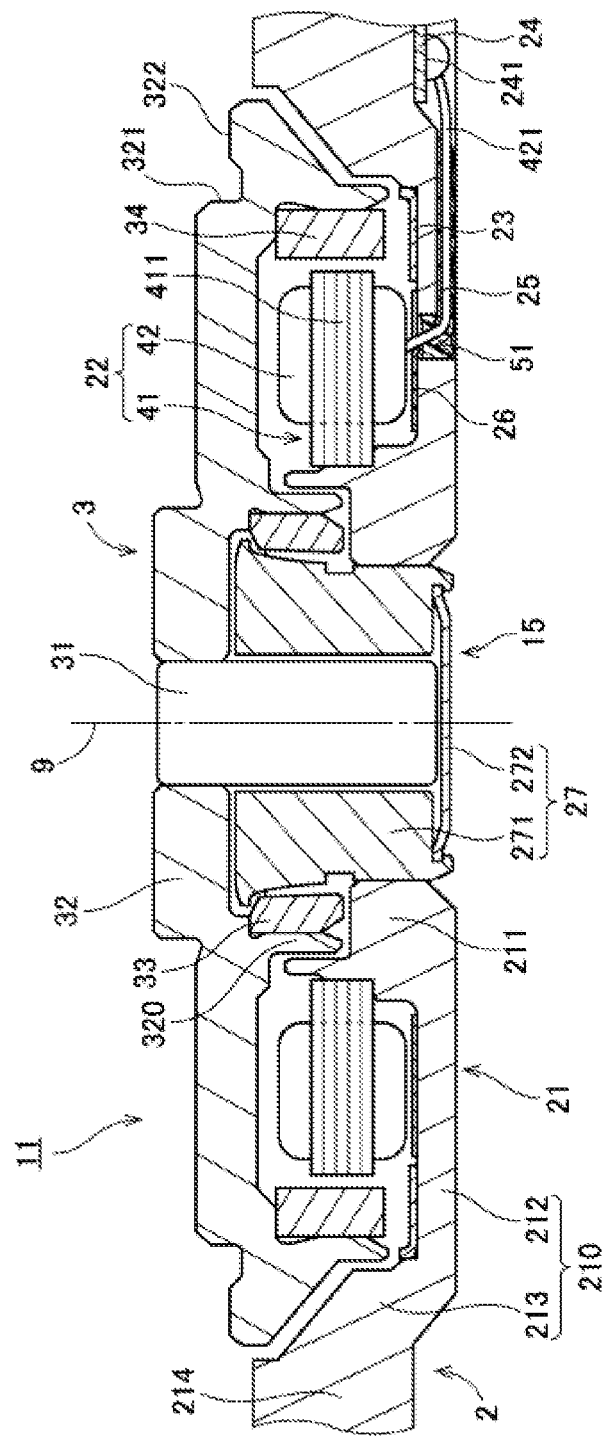
FIG. 3 is a vertical sectional view of a spindle motor according to the second preferred embodiment of the present invention.

Next, description will be made on the detailed configuration of the spindle motor 11. FIG. 3 is a vertical sectional view of the spindle motor 11. As shown in FIG. 3, the spindle motor 11 includes a stationary unit 2 and a rotary unit 3. The stationary unit 2 is kept stationary with respect to the base member 21 and the cover 14. The rotary unit 3 is supported to rotate with respect to the stationary unit 2.

The stationary unit 2 of the present preferred embodiment includes a base member 21, an armature 22, a thrust yoke 23, a circuit substrate 24, a first insulating sheet portion 25, a second insulating sheet portion 26, and a stationary bearing unit 27.

The base member 21 is arranged below the rotary unit 3, the magnetic disk 12 and the access unit 13 to extend in a direction orthogonal to the center axis 9. The base member 21 can be obtained by casting metal, e.g., aluminum. Alternatively, the base member 21 may be obtained by other methods such as, for example, cutting, pressing, etc. In addition, the base member 21 may be provided by a plurality of members.

The base member 21 preferably includes a cylinder portion 211, an inner bottom portion 212, a ring-shaped wall portion 213, and an outer bottom portion 214. The inner bottom portion 212 is arranged below the armature 22 to extend in a ring shape. Moreover, the inner bottom portion 212 is positioned more downward than the outer bottom portion 214. The cylinder portion 211 extends upward in a cylindrical or substantially cylindrical shape from the radial inner edge portion of the inner bottom portion 212. The ring-shaped wall portion 213 extends obliquely such that the height thereof becomes larger as the ring-shaped wall portion 213 goes radially outward from the radial outer edge of the inner bottom portion 212. The outer bottom portion 214 extends further radially outward from the radial outer edge of the ring-shaped wall portion 213.

The armature 22, the thrust yoke 23, the second insulating sheet portion 26, and a portion of the rotary unit 3 are accommodated at the upper side of the inner bottom portion 212 and at the radial inner side of the ring-shaped wall portion 213. Thus, the outer bottom portion 214 is arranged at the same height or substantially at the same height as the armature 22 and a portion of the rotary unit 3. The circuit substrate 24 is arranged radially outward of the inner bottom portion 212 and the ring-shaped wall portion 213. For that reason, the armature 22 and the circuit substrate 24 do not axially overlap with each other. Accordingly, the circuit substrate 24 can be arranged higher than the bottom surface of the inner bottom portion 212. This makes it possible to reduce the axial thickness of the spindle motor 11 as a whole.

The armature 22 preferably includes a stator core 41 and a plurality of coils 42. The stator core 41 and the coils 42 are positioned above the inner bottom portion 212. The stator core 41 preferably is defined by a steel plate laminate obtained by axially stacking electromagnetic steel plates, e.g., silicon steel plates, one above another. The stator core 41 is fixed to the outer circumferential surface of the cylinder portion 211. Moreover, the stator core 41 preferably includes a plurality of teeth 411 extending radially outward. The teeth 411 are preferably arranged at a regular or substantially regular interval in the circumferential direction.

The coils 42 are defined by lead wires wound around the respective teeth 411. The coils 42 of the present preferred embodiment are preferably defined by three lead wires 421 arranged to supply three-phase currents therethrough. The end portions of the respective lead wires 421 extend toward the lower surface of the base member 21 via a base through-hole 51 defined in the inner bottom portion 212.

The thrust yoke 23 is a ring-shaped member arranged on the upper surface of the inner bottom portion 212. The thrust yoke 23 is preferably made of a magnetic material, e.g., an electromagnetic steel plate (e.g., a silicon steel plate), a ferromagnetic stainless steel plate (e.g., SUS430), a cold-rolled steel plate (e.g., SPCC or SPCE), etc. The thrust yoke 23 is preferably positioned below the magnet 34 to be described later. A magnetic attraction force is generated between the thrust yoke 23 and the magnet 34. Thus, the rotary unit 3 is attracted toward the stationary unit 2.

The circuit substrate 24 is arranged on the lower surface of the outer bottom portion 214. Three land portions 241 including exposed copper foils are preferably arranged on the lower surface of the circuit substrate 24. The three lead wires 421 led out from the base through-hole 51 are respectively soldered to respective ones of the three land portions 241. Thus, the circuit substrate 24 and the coils 42 are electrically connected to each other. An electric current which drives the spindle motor 11 is supplied from an external power source to the coils 42 through the circuit substrate 24.

The number of the lead wires 421 led out from the base through-hole 51 is not limited to three. For example, four lead wires may be led out from the base through-hole 51.

A flexible printed substrate having flexibility is preferably used as the circuit substrate 24 of the present preferred embodiment. Use of the flexible printed substrate makes it possible to arrange the circuit substrate 24 along the irregularities of the lower surface of the base member 21. Use of the flexible printed substrate also makes it possible to reduce the axial thickness of the circuit substrate 24 as compared with other substrates. Accordingly, it is possible to further reduce the axial thickness of the spindle motor 11.

The stationary bearing unit 27 includes a sleeve 271 and a cap 272. The sleeve 271 is arranged around the below-mentioned shaft 31 to axially extend in a cylindrical or substantially cylindrical shape. The lower portion of the sleeve 271 is accommodated radially inward of the cylinder portion 211 of the base member 21 and is preferably fixed to the cylinder portion 211 by, e.g., an adhesive agent. The inner circumferential surface of the sleeve 271 is radially opposed to the outer circumferential surface of the shaft 31. The cap 272 closes the lower opening of the sleeve 271. The sleeve 271 may be defined by a plurality of members, for example.

The rotary unit 3 of the present preferred embodiment preferably includes a shaft 31, a hub 32, a ring-shaped member 33, and a magnet 34.

The shaft 31 is located radially inward of the sleeve 271 to extend in the axial direction. The shaft 31 is preferably made of metal, e.g., ferromagnetic or non-magnetic stainless steel. The upper end portion of the shaft 31 protrudes more upward than the upper surface of the sleeve 271.

The hub 32 extends radially outward from the peripheral edge of the upper end portion of the shaft 31. The inner circumferential portion of the hub 32 is fixed to the upper end portion of the shaft 31. As shown in FIG. 3, the hub 32 of the present preferred embodiment includes a ring-shaped projection 320 protruding downward. The ring-shaped member 33 is fixed to the inner circumferential surface of the ring-shaped projection 320. The inner circumferential surface of the ring-shaped member 33 is radially opposed to the outer circumferential surface of the sleeve 271.

The hub 32 preferably includes a first holding surface 321 having a cylindrical or substantially cylindrical shape and a second holding surface 322 extending radially outward from the lower end portion of the first holding surface 321. The inner circumferential portion of the magnetic disk 12 makes contact with at least a portion of the first holding surface 321. Furthermore, the lower surface of the magnetic disk 12 makes contact with at least a portion of the second holding surface 322. Thus, the magnetic disk 12 is held in place.

A lubricant is provided between the shaft 31 and the stationary bearing unit 27, between the hub 32 and the stationary bearing unit 27 and between the ring-shaped member 33 and the stationary bearing unit 27. The liquid level of the lubricant is positioned between the sleeve 271 and the ring-shaped member 33. For example, polyol ester-based oil or diester-based oil is preferably used as the lubricant. The shaft 31 is rotatably supported with respect to the stationary bearing unit 27 through the lubricant.

That is to say, in the present preferred embodiment of the present invention, a bearing mechanism 15 preferably is defined by the sleeve 271 and the cap 272, which are members belonging to the stationary unit 2; the shaft 31, the hub 32 and the ring-shaped member 33, which are members belonging to the rotary unit 3; and the lubricant present between these members. The bearing mechanism 15 is accommodated within the cylinder portion 211. The rotary unit 3 is supported on the bearing mechanism 15 and is rotated about the center axis 9.

The magnet 34 is preferably arranged radially outward of the armature 22 and is fixed to the hub 32. The magnet 34 of the present preferred embodiment preferably has an annular or substantially annular shape. The inner circumferential surface of the magnet 34 is radially opposed to the radial outer end surfaces of the teeth 411. The inner circumferential surface of the magnet 34 is alternately magnetized with N-poles and S-poles along the circumferential direction.

A plurality of magnets may be used in place of the annular magnet 34. In case of using a plurality of magnets, they may be arranged along the circumferential direction so that N-poles and S-poles can be alternately lined up.

In the spindle motor 11 described above, if a drive current is supplied to the coils 42 via the circuit substrate 24, magnetic fluxes are generated in the teeth 411. Then, circumferential torque is generated by the magnetic fluxes acting between the teeth 411 and the magnet 34. As a result, the rotary unit 3 is rotated about the center axis 9 with respect to the stationary unit 2. The magnetic disk 12 supported on the hub 32 is rotated about the center axis 9 together with the rotary unit 3.

Figure 4:
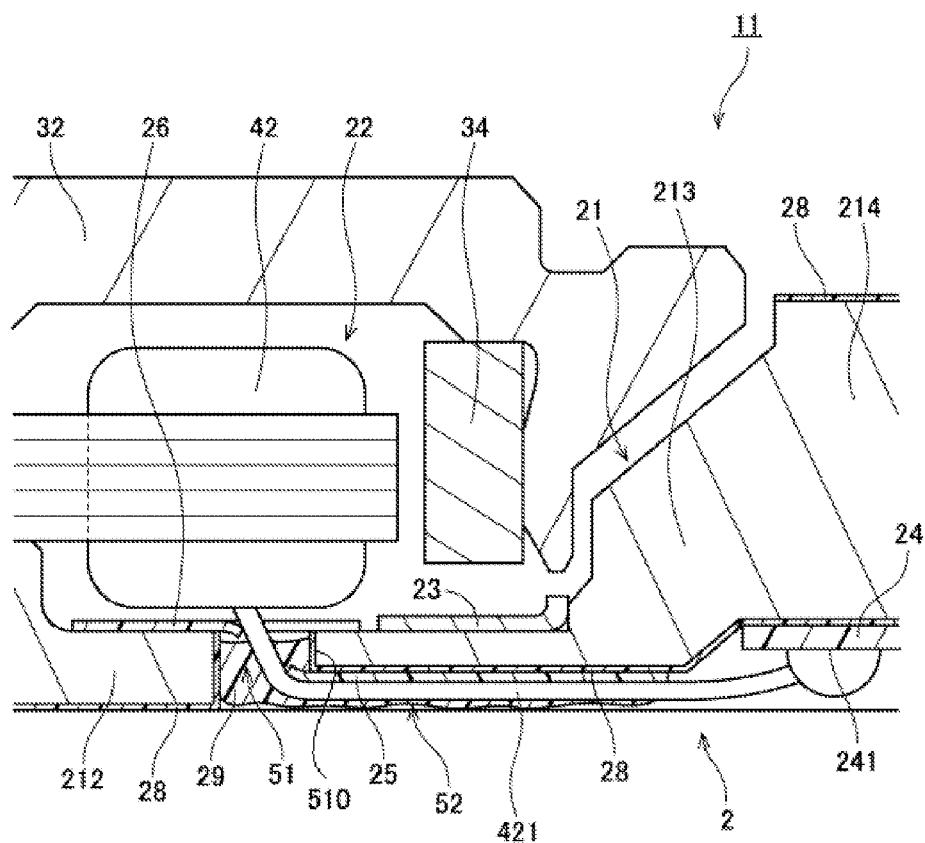
FIG. 4 is a partial vertical sectional view of the spindle motor according to the second preferred embodiment of the present invention.
Figure 5:
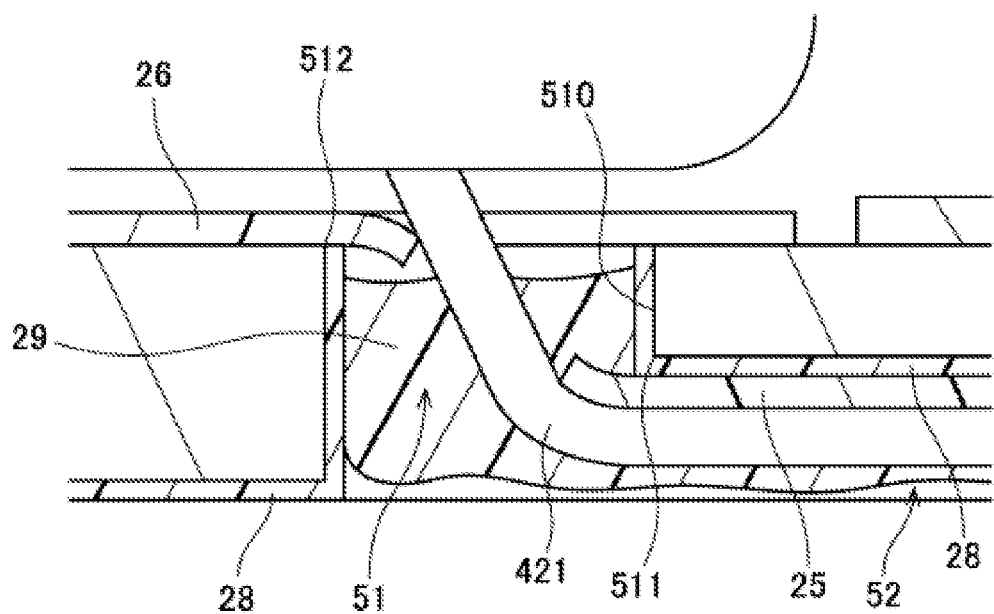
FIG. 5 is a partial vertical sectional view of a stationary unit according to the second preferred embodiment of the present invention.
Figure 6:
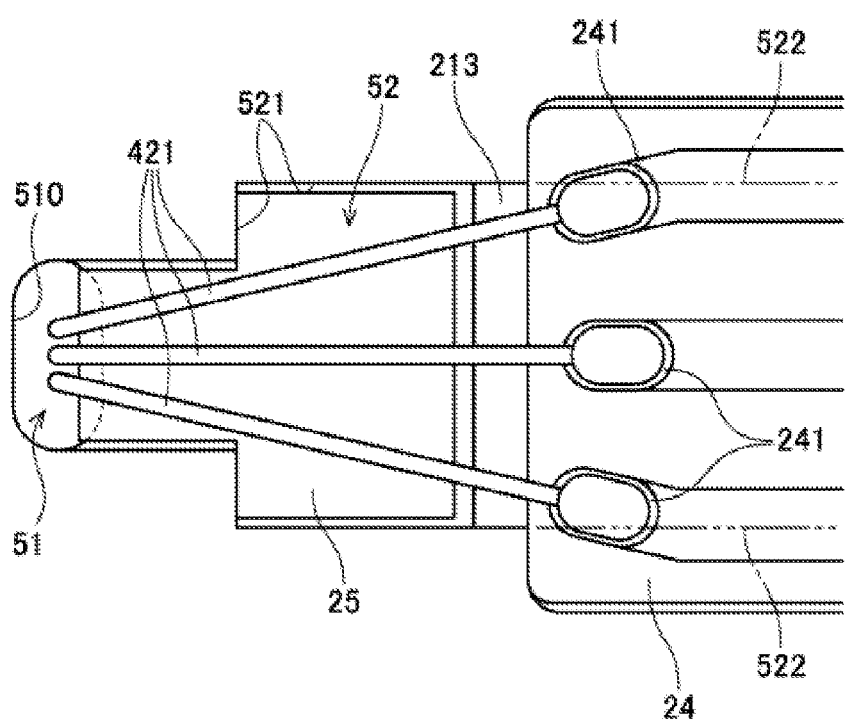
FIG. 6 is a partial bottom view of a base member according to the second preferred embodiment of the present invention.
Figure 7:
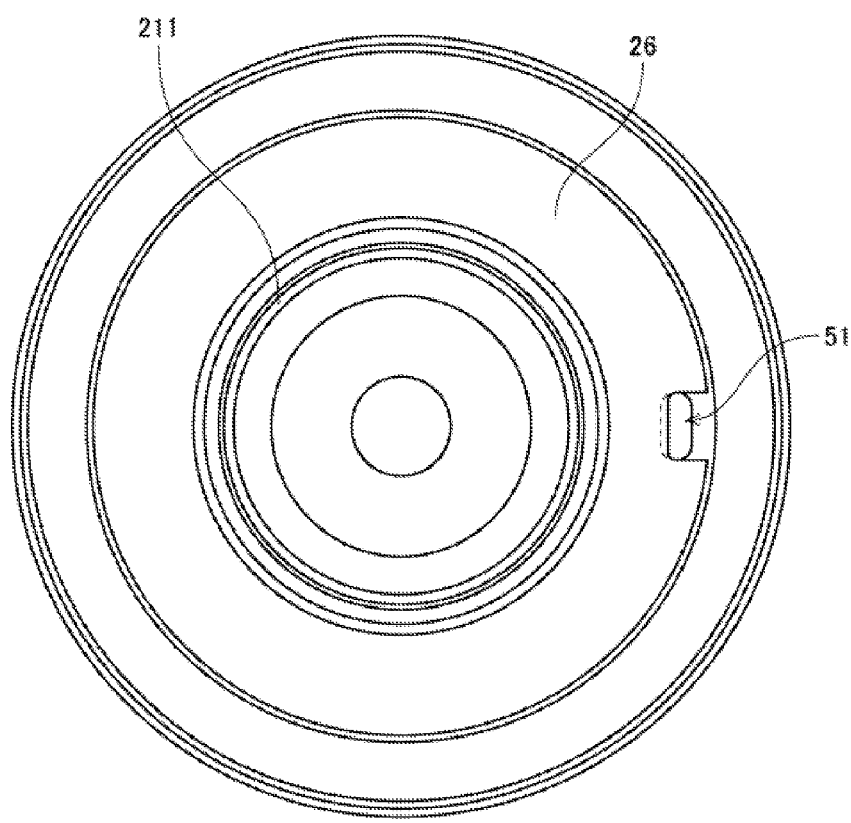
FIG. 7 is a partial plan view of the base member according to the second preferred embodiment of the present invention.

Next, description will be made on the routes of the lead wires 421 extending from the coils 42 to the land portions 241. FIG. 4 is a partial sectional view of the spindle motor 11, which includes each of the routes of the lead wires 421 extending from the coils 42 to the land portions 241. FIG. 5 is a vertical sectional view showing a portion of each of the routes of the lead wires 421 on an enlarged scale. FIG. 6 is a partial bottom view of the base member 21, which includes the routes of the lead wires 421. FIG. 7 is a partial plan view of the base member 21. In FIG. 6, an adhesive agent 29 is omitted from the illustration. In FIG. 7, the adhesive agent 29 and the lead wires 421 are omitted from the illustration. In the following description, reference will be made to FIG. 3 and, if appropriate, FIGS. 4 through 7.

At least a portion of the surface of the base member 21 is preferably covered with an insulating portion 28 to electrically insulate at least the portion of the base member 21. The insulating portion 28 is preferably formed by electro-coating, e.g., a resin as an insulating material. Alternatively, the insulating portion 28 may be formed by coating. In the present preferred embodiment, as shown in FIGS. 4 and 5, at least the lower surface of the inner bottom portion 212, the lower surface of the ring-shaped wall portion 213, the lower surface of the outer bottom portion 214, and the upper surface of the outer bottom portion 214 are covered with the insulating portion 28.

The base member 21 includes a base through-hole 51. The base through-hole 51 is arranged below the armature 22 to axially extend through the inner bottom portion 212. A tubular surface 510 of the base member 21 defining the base through-hole 51 is preferably covered with the insulating portion 28. Furthermore, a base groove portion 52 extending in the radial direction is preferably defined on the lower surfaces of the inner bottom portion 212 and the ring-shaped wall portion 213. The base groove portion 52 extends radially outward from the lower end portion of the base through-hole 51 toward the circuit substrate 24. In other words, the lower end portion of the base through-hole 51 is opened into the base groove portion 52. The bottom surface and the wall surfaces defining the base groove portion 52 are preferably covered with the insulating portion 28.

A first insulating sheet portion 25 is preferably arranged within the base groove portion 52. The first insulating sheet portion 25 is fixed to the bottom surface of the base groove portion 52 preferably by an adhesive agent or a sticky material, for example. In addition, a second insulating sheet portion 26 is arranged on the upper surface of the inner bottom portion 212. The second insulating sheet portion 26 is preferably fixed to the upper surface of the inner bottom portion 212 by an adhesive agent or a sticky material, for example.

The first insulating sheet portion 25 and the second insulating sheet portion 26 are preferably defined by an insulating material, e.g., a resin such as polyethylene terephthalate (PET) or the like. The thickness of the first insulating sheet portion 25 and the second insulating sheet portion 26 is preferably larger than the thickness of the insulating portion 28 and is smaller than the thickness of the circuit substrate 24 at the land portions 241. At least a portion of the surface of the base member 21 may be covered with a metal plating layer. In this case, the thickness of the first insulating sheet portion 25 is preferably larger than the thickness of the metal plating layer.

The second insulating sheet portion 26 is interposed between the inner bottom portion 212 and the coils 42. This prevents the base member 21 and the coils 42 from making contact with each other. Thus, the base member 21 and the coils 42 are electrically insulated from each other. The interposition of the second insulating sheet portion 26 makes it possible to bring the inner bottom portion 212 and the coils 42 into close proximity with each other in the axial direction. This further reduces the axial thickness of the spindle motor 11.

As shown in FIGS. 4 and 5, each of the lead wires 421 extends toward the base through-hole 51 from the upper side of the inner bottom portion 212 and from the radial inner side of the center of the base through-hole 51. Moreover, each of the lead wires 421 extends into the base groove portion 52 via the base through-hole 51. Within the base groove portion 52, each of the lead wires 421 extends radially outward along the lower surface of the first insulating sheet portion 25. The end portion of each of the lead wires 421 is soldered to each of the land portions 241 of the circuit substrate 24 at the radial outer side of the inner bottom portion 212.

Each of the lead wires 421 led out toward the lower surface of the inner bottom portion 212 in this manner is accommodated within the base groove portion 52. The axial depth of the base groove portion 52 is larger than the sum of the thickness of the insulating portion 28, the thickness of the first insulating sheet portion 25, and the diameter of each of the lead wires 421. Thus, each of the lead wires 421 is prevented from protruding more downward than the lower surface of the inner bottom portion 212. As a result, the axial thickness of the spindle motor 11 gets reduced. The diameter of each of the lead wires 421 mentioned above denotes the diameter of a cross section including both a bare conductor of each of the lead wires 421 and a protection film covering the bare conductor.

The first insulating sheet portion 25 and the second insulating sheet portion 26 are interposed between the inner bottom portion 212 and each of the lead wires 421. This prevents the base member 21 and the lead wires 421 from making contact with each other. Thus, the base member 21 and the lead wires 421 are electrically insulated from each other. Particularly, in the present preferred embodiment, when seen in a plan view, a portion of the first insulating sheet portion 25 overlaps with the radial outer end portion of the lower opening of the base through-hole 51. Moreover, when seen in a plan view, a portion of the second insulating sheet portion 26 overlaps with the radial inner end portion of the upper opening of the base through-hole 51. This prevents the base member 21 and the lead wires 421 from making contact with each other.

In the present preferred embodiment, as shown in FIG. 5, the first insulating sheet portion 25 is interposed between a radial outer lower corner portion 511 of the tubular surface 510 defining the base through-hole 51 and each of the lead wires 421. For that reason, each of the lead wires 421 does not make contact with the lower corner portion 511 or the insulating portion 28 covering the lower corner portion 511. Moreover, the second insulating sheet portion 26 is interposed between a radial inner upper corner portion 512 of the tubular surface 510 defining the base through-hole 51 and each of the lead wires 421. For that reason, each of the lead wires 421 preferably does not make contact with the upper corner portion 512 or the insulating portion 28 covering the upper corner portion 512. Thus, stresses are prevented from concentrating on the lead wires 421. As a result, the lead wires 421 are prevented from getting damaged.

Each of the lead wires 421 led out from the coils 42 include a bare conductor and a protection film (not shown) covering the bare conductor, which is made of an insulating material. The protection film is easily damaged when it makes contact with a rigid material such as metal or the like. In the present preferred embodiment, the lead wires 421 make contact with the first insulating sheet portion 25 and the second insulating sheet portion 26 which are lower in rigidity than the metal of which the base member 21 is made. Thus, the protection film is prevented from getting damaged. Even if the protection film of each of the lead wires 421 gets damaged, there is no possibility that the lead wires 421 and the base member 21 make contact with each other. In particular, the first insulating sheet portion 25 and the second insulating sheet portion 26 are preferably made of an insulating material. This prevents electric conduction between the lead wires 421 and the base member 21.

In the present preferred embodiment, the radial inner end portion of the first insulating sheet portion 25 is positioned radially inward of the radial outer lower corner portion 511 of the tubular surface 510 defining the base through-hole 51. The radial inner end portion of the first insulating sheet portion 25 is preferably positioned near the lower corner portion 511. Moreover, the radial inner end portion of the first insulating sheet portion 25 is separated from the tubular surface 510. In other words, the radial inner end portion of the first insulating sheet portion 25 becomes a free end. The lead wires 421 make contact with the radial inner end portion of the first insulating sheet portion 25. Thus, the first insulating sheet portion 25 is bent upward at the radial inner side of the lower corner portion 511. This reduces the force generated between the first insulating sheet portion 25 and the lead wires 421. As a result, the lead wires 421 are further prevented from getting damaged.

Similarly, the end portion of the second insulating sheet portion 26 provided within the base through-hole 51 is positioned radially outward of the radial outer upper corner portion 512 of the tubular surface 510. This end portion of the second insulating sheet portion 26 is positioned near the upper corner portion 512. This end portion of the second insulating sheet portion 26 is bent downward by making contact with the lead wires 421. This reduces the force generated between the second insulating sheet portion 26 and the lead wires 421. As a result, the lead wires 421 are further prevented from getting damaged.

In the present preferred embodiment, the lead wires 421 extend from the coils 42 to the land portions 241 with little slackness. In other words, tensions are exerted on the lead wires 421. This prevents the lead wires 421 from protruding downward from the base groove portion 52. However, if tensions are exerted on the lead wires 421, the protection films covering the surfaces of the lead wires 421 get damaged with ease. In the present preferred embodiment, however, the external forces applied to the lead wires 421 are reduced by the first insulating sheet portion 25 and the second insulating sheet portion 26. As a result, the lead wires 421 are prevented from being damaged.

In the present preferred embodiment, the first insulating sheet portion 25 and the circuit substrate 24 are provided by different members. The radial outer end portion of the first insulating sheet portion 25 is positioned radially inward of the radial inner end portion of the circuit substrate 24. The lower surface of the ring-shaped wall portion 213 is positioned between the radial outer end portion of the first insulating sheet portion 25 and the radial inner end portion of the circuit substrate 24. That is to say, in the present preferred embodiment, the first insulating sheet portion 25 is not arranged on the lower surface of the ring-shaped wall portion 213 as a slant surface or a step surface. This makes it possible to prevent the first insulating sheet portion 25 from being separated downward from the base member 21.

In the present preferred embodiment, as shown in FIGS. 4 through 6, the radial inner end portion of the first insulating sheet portion 25 is positioned radially outward of the radial inner end portion of the tubular surface 510 defining the base through-hole 51. Furthermore, the axial thickness of the base member 21 at the radial inner side of the base through-hole 51 is larger than the axial thickness of the base groove portion 52 of the base member 21. This increases the rigidity of the base member 21 at the radial inner side of the base through-hole 51.

In the present preferred embodiment, as shown in FIG. 6, three lead wires 421 extend radially or substantially radially from the lower end portion of the base through-hole 51. The circumferential width of each of the base groove portion 52 and the first insulating sheet portion 25 is widened radially outward in a stepwise fashion. This prevents the lead wires 421 and the wall surfaces 521 of the base groove portion 52 from making contact with each other. In the present preferred embodiment, as shown in FIG. 6, a portion of the wall surfaces 521 of the base groove portion 52 makes contact with the first insulating sheet portion 25 in the radial direction. Thus, the first insulating sheet portion 25 is radially positioned in place.

Referring to FIG. 6, a pair of imaginary lines 522 extending radially outward from the opposite wall surfaces 521 of the radial outer end portion of the base groove portion 52 is indicated by double-dot chain lines. In the present preferred embodiment, the center of the respective land portions 241 is positioned between the imaginary lines 522. This makes it possible to prevent the lead wires 421 extending toward the respective land portions 241 from making contact with the wall surfaces 521 of the base groove portion 52.

As shown in FIG. 6, each of the land portions 241 of the present preferred embodiment preferably has an elliptical or substantially elliptical shape having a major axis and a minor axis when seen in a plan view. The major axes of the respective land portions 241 are arranged to extend along the substantially radial lines diverging from the base through-hole 51. This makes it possible to prolong the length of the lead wires 421 overlapping with the respective land portions 241. For that reason, it becomes easy to solder the lead wires 421 to the respective land portions 241.

As shown in FIGS. 4 and 5, the stationary unit 2 of the present preferred embodiment preferably further includes an adhesive agent 29 as a sealing material. The base through-hole 51 is sealed by the adhesive agent 29. This prevents gasses from flowing through the base through-hole 51. As a result, it is possible to enhance the air-tightness of the disk drive apparatus 1. In addition, the lead wires 421 are fixed by the adhesive agent 29. As a result, the lead wires 421 are prevented from protruding more downward than the lower surface of the inner bottom portion 212.

In the present preferred embodiment, the adhesive agent 29 is arranged not only within the base through-hole 51 but also within the base groove portion 52. This makes it possible to fix the lead wires 421 by the adhesive agent 29 over a broader range. For that reason, the lead wires 421 are prevented from protruding more downward than the lower surface of the inner bottom portion 212.

In the present preferred embodiment, the axial depth of the base groove portion 52 is larger than the sum of the thickness of the insulating portion 28, the thickness of the first insulating sheet portion 25, the diameter of the lead wire 421, and the thickness of the adhesive agent 29. Thus, the adhesive agent 29 is prevented from extruding downward from the base groove portion 52.

Other sealing materials may be used in place of the adhesive agent 29. For example, a resin material other than the adhesive agent may be used as a sealing material.

While illustrative preferred embodiments of the present invention have been described above, the present invention is not limited to the aforementioned preferred embodiments.

Figure 8:
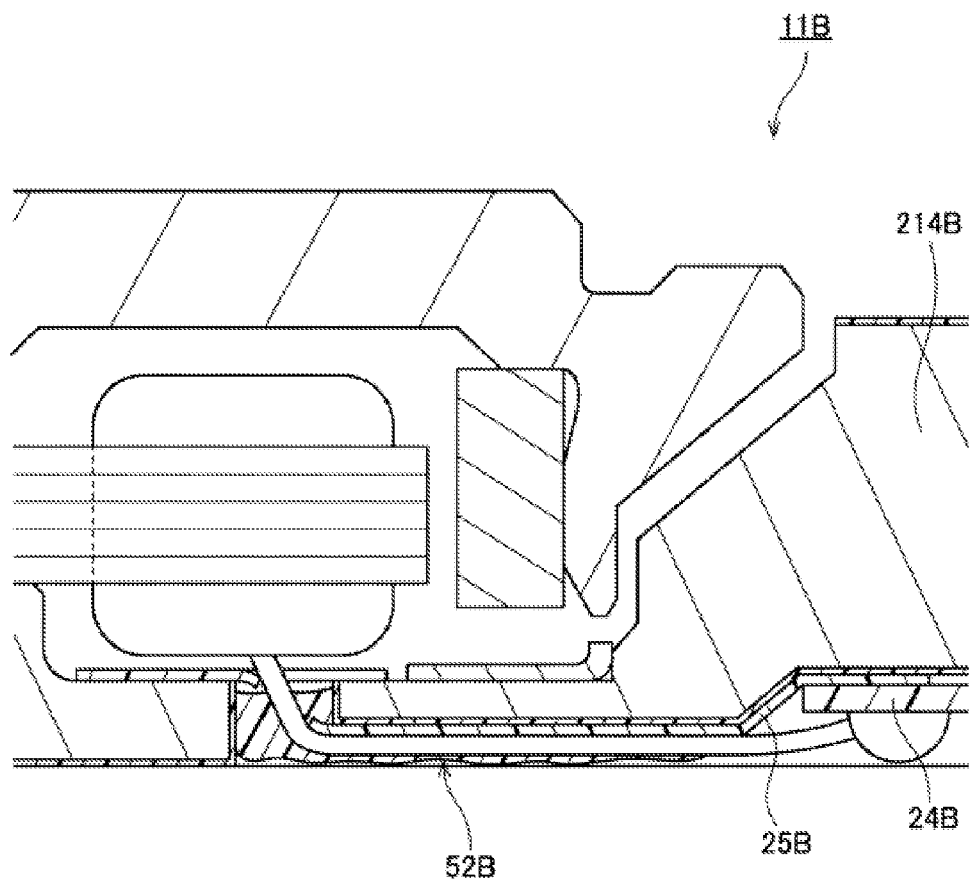
FIG. 8 is a partial vertical sectional view of a spindle motor according to a modified example of a preferred embodiment of the present invention.

FIG. 8 is a partial vertical sectional view of a spindle motor 11B according to one modified example of a preferred embodiment of the present invention. In the example shown in FIG. 8, the first insulating sheet portion 25B extends to the lower surface of the outer bottom portion 214B within the base groove portion 52B. A portion of the radial outer region of the first insulating sheet portion 25B is covered with the circuit substrate 24B. As a result, a portion of the lower surface of the first insulating sheet portion 25B makes contact with a portion of the upper surface of the circuit substrate 24B. Thus, by use of the circuit substrate 24B thicker than the first insulating sheet portion 25B, it is possible to prevent the first insulating sheet portion 25B from being separated downward from the base member.

Figure 9:
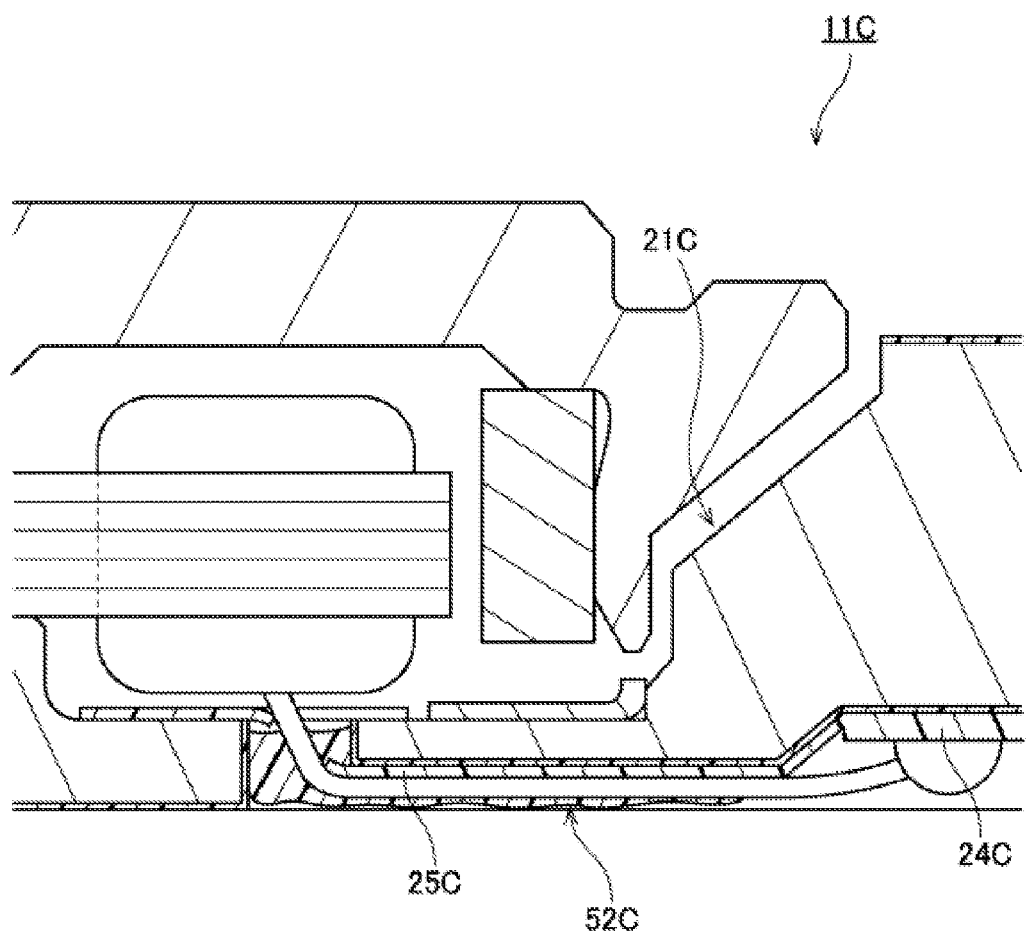
FIG. 9 is a partial vertical sectional view of a spindle motor according to a modified example of a preferred embodiment of the present invention.

FIG. 9 is a partial vertical sectional view of a spindle motor 11C according to another modified example of a preferred embodiment of the present invention. In the example shown in FIG. 9, a portion of the circuit substrate 24C extends into the base groove portion 52C so as to define the first insulating sheet portion 25C. This makes it possible to handle the circuit substrate 24C and the first insulating sheet portion 25C as a single member during assembly. For that reason, it is possible to reduce the number of steps required to attach the circuit substrate 24C and the first insulating sheet portion 25C to the base member 21C.

Figure 10:
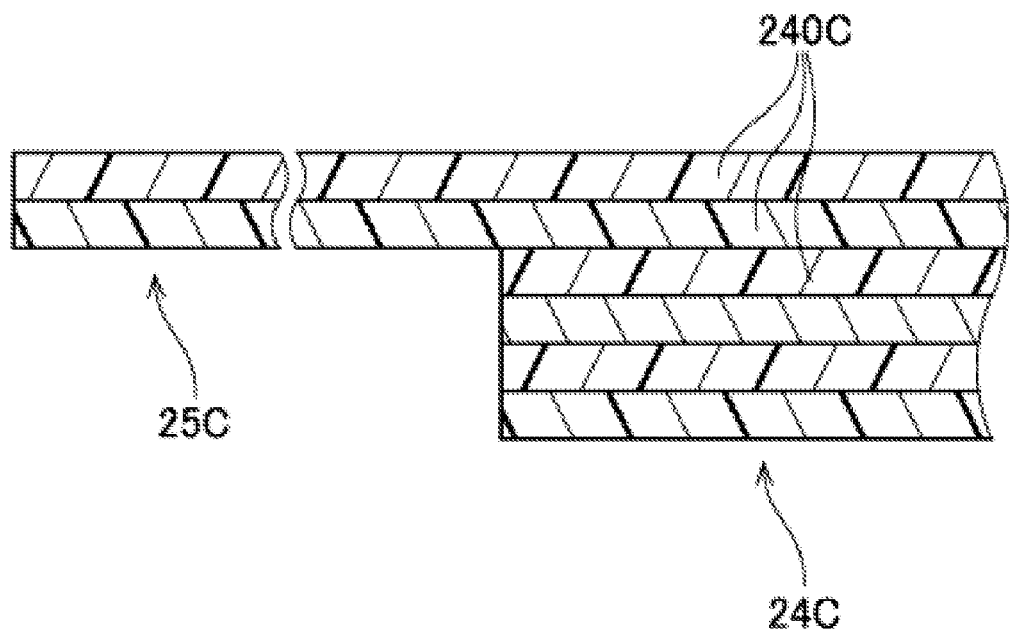
FIG. 10 is a vertical sectional view of a circuit substrate according to a modified example of a preferred embodiment of the present invention.

FIG. 10 is a partial vertical sectional view of the circuit substrate 24C. As shown in FIG. 10, the circuit substrate 24C is preferably defined by a plurality of thin films 240C axially stacked one above another. A portion of the thin films 240C extends toward the base groove portion 52C so as to define a first insulating sheet portion 25C. The first insulating sheet portion 25C provided in this manner is axially thinner than the first insulating sheet portion 25C defined by all the thin films 420C of the circuit substrate 24C. Accordingly, it is possible to make the spindle motor 11C thinner in the axial direction.

More specifically, two layers, i.e., a sticky material layer and a polyimide layer, of the thin films 240C defining the circuit substrate 24C may be caused to extend into the base groove portion 52C, thereby defining the first insulating sheet portion 25C. This makes it possible to define the first insulating sheet portion 25C with a minimum number of layers. Accordingly, it is possible to make the first insulating sheet portion 25C thinner in the axial direction.

If the first insulating sheet portion 25 and the circuit substrate 24 are provided by different members as in the second preferred embodiment described above, it is possible to freely select the material of the first insulating sheet portion 25. In other words, the material of the first insulating sheet portion 25 is not limited to the material of the circuit substrate 24. This is desirable in that a suitable material can be used as the material of the first insulating sheet portion 25.

Figure 11:
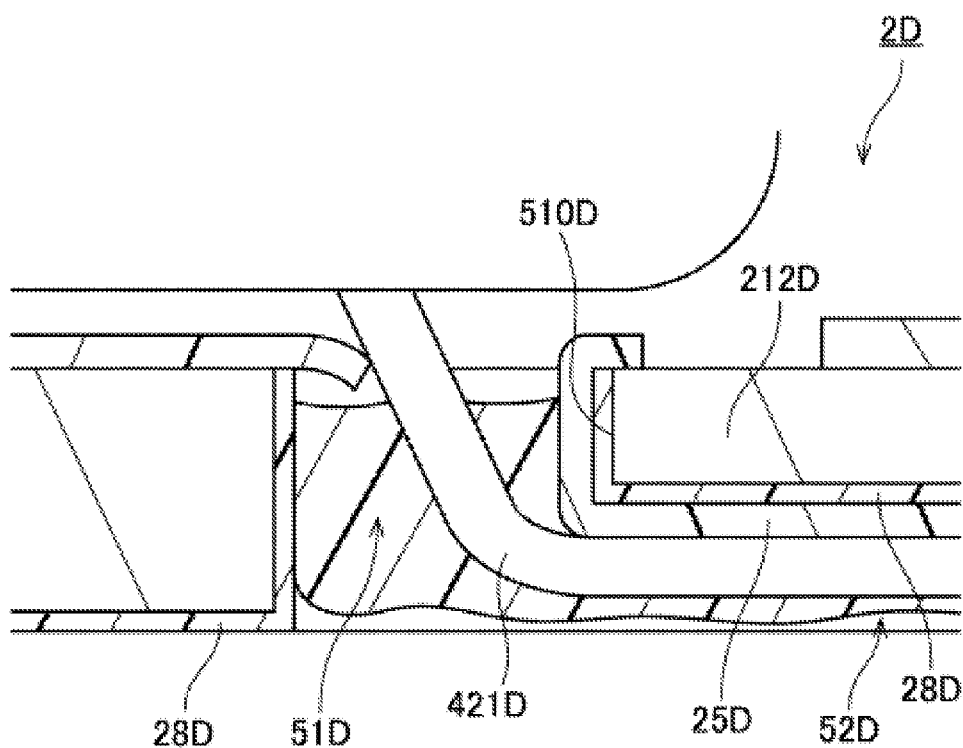
FIG. 11 is a partial vertical sectional view of a stationary unit according to a modified example of a preferred embodiment of the present invention.

FIG. 11 is a partial vertical sectional view of a stationary unit 2D according to a further modified example of a preferred embodiment of the present invention. In the example shown in FIG. 11, the first insulating sheet portion 25D extends upward from the radial inner end portion of the base groove portion 52D along the tubular surface 510D defining the base through-hole 51D through which the lead wires 421D extend. The end portion of the first insulating sheet portion 25D reaches the upper surface of the inner bottom portion 212D. Moreover, the first insulating sheet portion 25D makes contact with the insulating portion 28D covering the tubular surface 510D. In this manner, the end portion of the first insulating sheet portion 25D may not be necessarily positioned within the base through-hole 51D.

Figure 12:
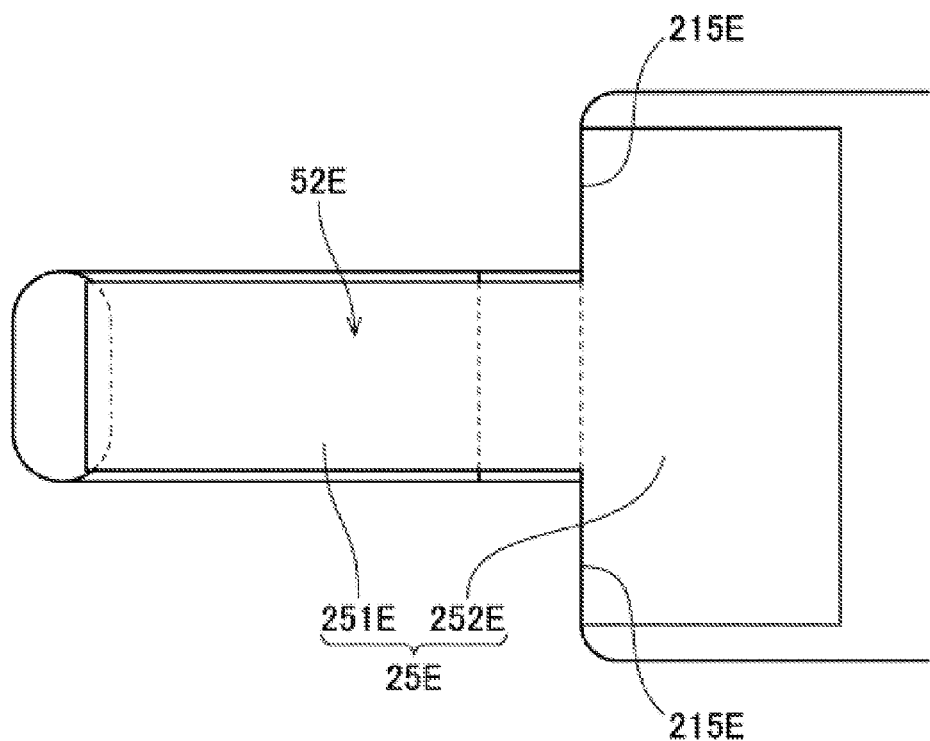
FIG. 12 is a partial bottom view of a base member according to a modified example of a preferred embodiment of the present invention.

FIG. 12 is a partial bottom view of a base member according to a still further modified example of a preferred embodiment of the present invention. In the example shown in FIG. 12, the first insulating sheet portion 25E preferably includes an inner sheet portion 251E and an outer sheet portion 252E. The inner sheet portion 251E is positioned within the base groove portion 52E. The outer sheet portion 252E is positioned radially outward of the base groove portion 52E. The circumferential width of the outer sheet portion 252E is larger than the circumferential width of the inner sheet portion 251E and the base groove portion 52E.

In this case, a pair of end surfaces 215E circumferentially extending from the radial outer end portion of the base groove portion 52E is preferably radially opposed to the radial inner edge portion of the outer sheet portion 252E. For that reason, the first insulating sheet portion 25E can be radially positioned in place through the use of the end surfaces 215E.

Figure 13:
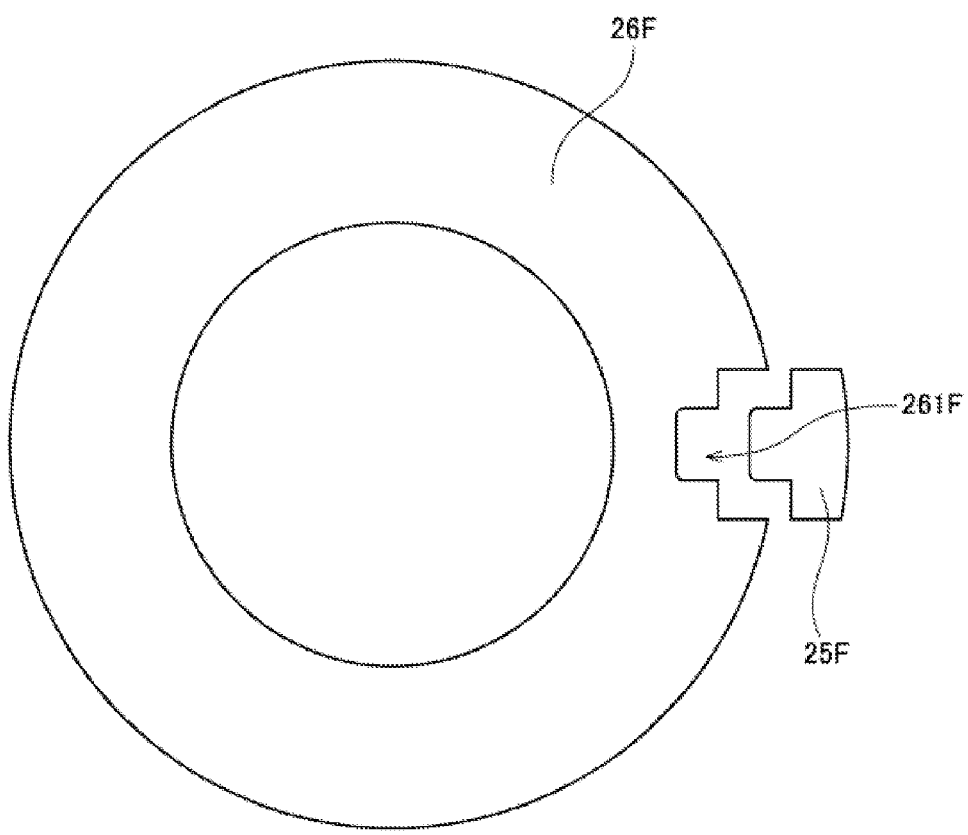
FIG. 13 is a plan view of a first insulating sheet portion and a second insulating sheet portion according to a modified example of a preferred embodiment of the present invention.

FIG. 13 is a plan view of a first insulating sheet portion 25F and a second insulating sheet portion 26F according to a yet another further modified example of a preferred embodiment of the present invention. The second insulating sheet portion 26F shown in FIG. 13 preferably includes a cutout 261F depressed radially inward from the radial outer edge thereof. After the manufacture of the spindle motor 11, the radial inner end portion of the cutout 261F is positioned in the upper end portion of the base through-hole. In the example shown in FIG. 13, the first insulating sheet portion 25F is formed through the use of a portion which has been cut away to form the cutout 261F of the second insulating sheet portion 26F. The shape of the first insulating sheet portion 25F may correspond to the shape of the cutout 261F. The first insulating sheet portion 25F may be smaller in size than the cutout 261F. This makes it possible to reduce the disposal amount of the resin material.

Figure 14:
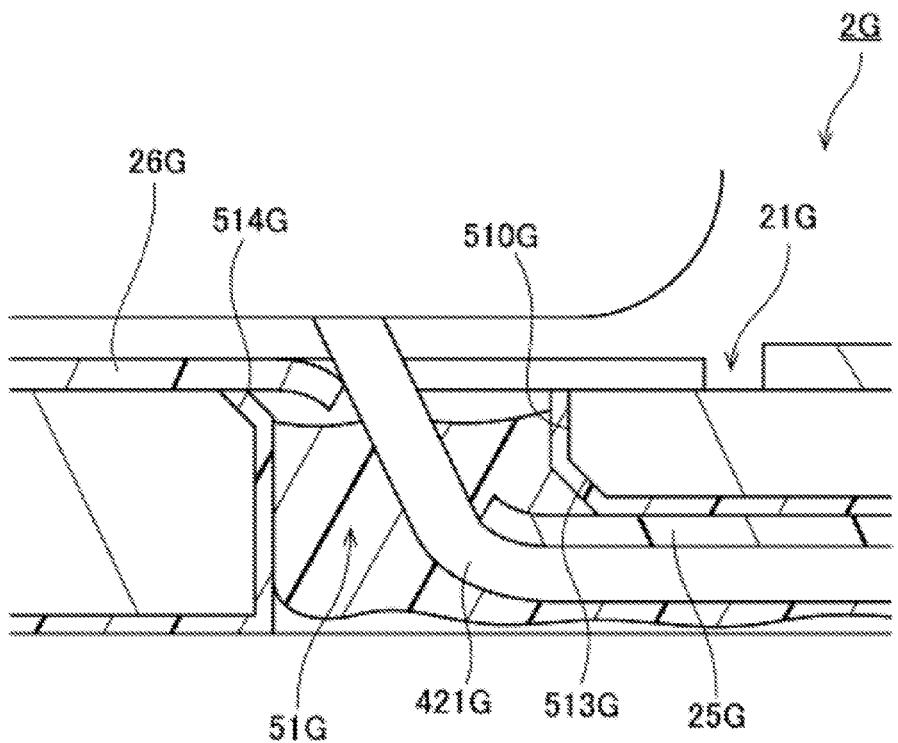
FIG. 14 is a partial vertical sectional view of a stationary unit according to a modified example of a preferred embodiment of the present invention.

FIG. 14 is a partial vertical sectional view of a stationary unit 2G according to a yet another further modified example of a preferred embodiment of the present invention. The base member 21G shown in FIG. 14 preferably includes a lower chamfered surface 513G defined in the lower opening edge of the base through-hole 51G. When seen in a plan view, the lower chamfered surface 513G overlaps with a portion of the first insulating sheet portion 25G. The base member 21G shown in FIG. 14 further includes an upper chamfered surface 514G defined in the upper opening edge of the base through-hole 51G. When seen in a plan view, the upper chamfered surface 514G overlaps with a portion of the second insulating sheet portion 26G. This makes it possible to widen the flexible regions of the first insulating sheet portion 25G and the second insulating sheet portion 26G without having to enlarge the inner diameter of the base through-hole 51G as a whole. For that reason, the stresses acting on the lead wires 421G are reduced. When seen in a vertical cross section, the base member 21G may include curvilinear round surfaces in place of the lower chamfered surface 513G and the upper chamfered surface 514G.

If the lower chamfered surface 513G and the upper chamfered surface 514G are provided as shown in FIG. 14, the corner portions arranged in the upper and lower end portions of the tubular surface 510G defining the base through-hole 51G become gentle. Thus, the external forces acting on the lead wires 421G will be reduced. Accordingly, the protection films covering the lead wires 421G are further prevented from getting damaged.

In the second preferred embodiment and the respective modified examples of preferred embodiments of the present invention, the insulating portion is preferably provided between the first insulating sheet portion and the inner bottom portion. However, the present invention is not limited thereto. For example, the insulating portion may be omitted as long as contact between the lead wires and the base member can be prevented by the first insulating sheet portion.

Furthermore, the circuit substrate may extend to the lower surface of the ring-shaped wall portion. The land portions may be arranged in the portion of the circuit substrate positioned on the lower surface of the ring-shaped wall portion. The lead wires may be soldered to the land portions.

Moreover, the circuit substrate may not necessarily be a flexible printed substrate. The circuit substrate may be, e.g., a rigid substrate such as, for example, a connector or the like.

The spindle motor of the various preferred embodiments of the present invention can be applied to different kinds of disk drive apparatuses. The disk drive apparatus may be the one that rotates a disk other than the magnetic disk, e.g., an optical disk. According to preferred embodiments of the present invention, it is possible to make the disk drive apparatus thinner in the axial direction. Accordingly, preferred embodiments of the present invention are particularly useful in a spindle motor included in a disk drive apparatus for a thin notebook-type PC or a tablet-type PC.

Figure 15:
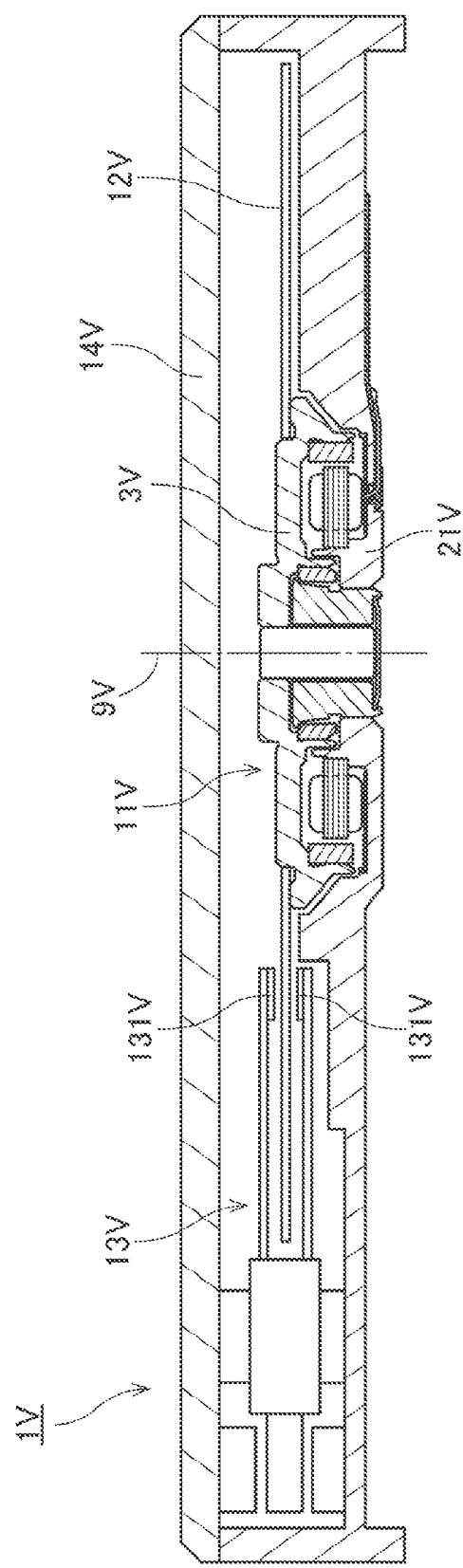
FIG. 15 is a vertical sectional view of a disk drive apparatus according to a third preferred embodiment of the present invention.

FIG. 15 is a vertical sectional view of a disk drive apparatus 1V according to a third preferred embodiment of the present invention. The disk drive apparatus 1V is preferably an apparatus which rotates, e.g., a magnetic disk 12V, and performs information reading and writing tasks with respect to the magnetic disk 12V. As shown in FIG. 15, the disk drive apparatus 1V preferably includes a spindle motor 11V, a magnetic disk 12V, an access mechanism 13V, and a cover 14V.

The spindle motor 11V supports the magnetic disk 12V and rotates the magnetic disk 12V about a center axis 9V. The spindle motor 11V preferably includes a base member 21V extending in a direction orthogonal to the center axis 9V. The upper region of the base member 21V is preferably covered with the cover 14V. The rotary portion 3V of the spindle motor 11V, the magnetic disk 12V, and the access mechanism 13V are accommodated within a housing defined by the base member 21V and the cover 14V. The access mechanism 13V is arranged to move a head 131V along the recording surface of the magnetic disk 12V and to perform information reading and writing tasks with respect to the magnetic disk 12V.

The disk drive apparatus 1V may include two or more magnetic disks 12V. Furthermore, the access mechanism 13V may perform only one of the information reading and writing tasks with respect to the magnetic disk 12V.

Figure 16:
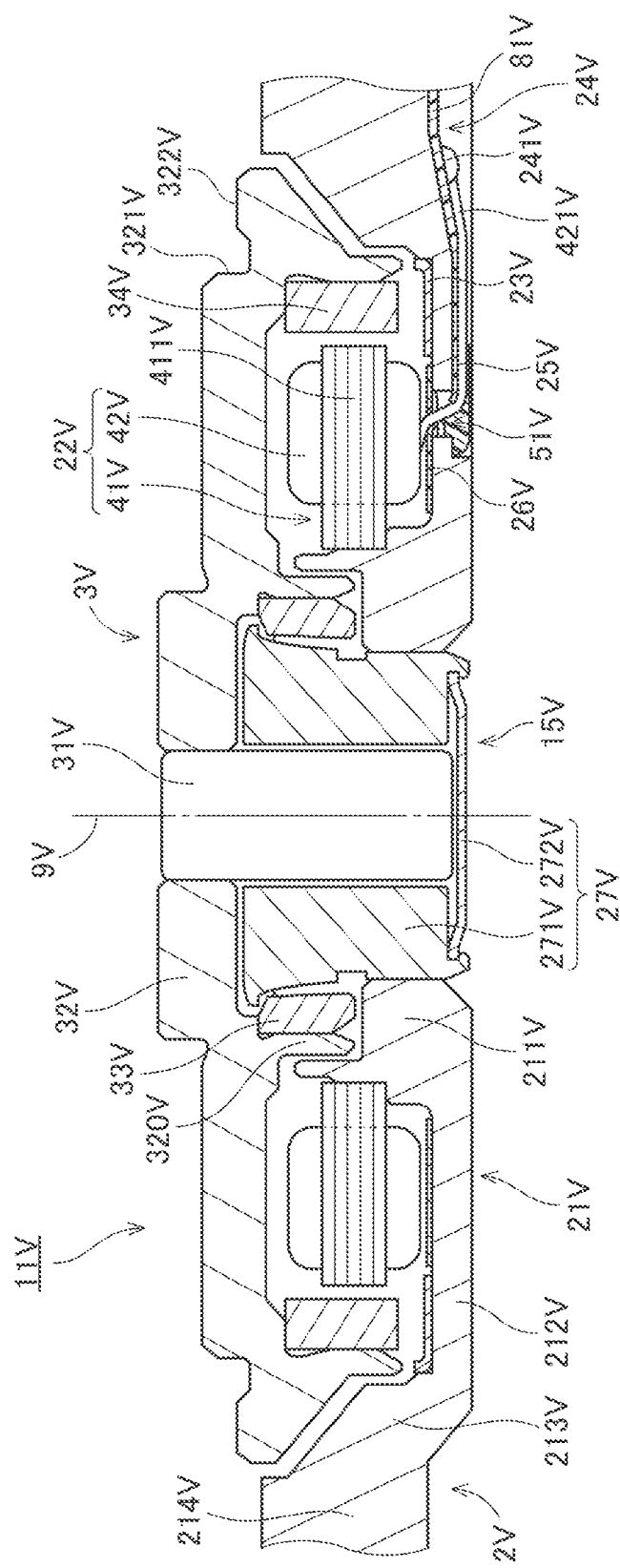
FIG. 16 is a vertical sectional view of a spindle motor according to the third preferred embodiment of the present invention.

Next, description will be made on the detailed configuration of the spindle motor 11V. FIG. 16 is a vertical sectional view of the spindle motor 11V. As shown in FIG. 16, the spindle motor 11V includes a stationary portion 2V and a rotary portion 3V. The rotary portion 3V is supported to rotate with respect to the stationary portion 2V.

The stationary portion 2V preferably includes a base member 21V, a stator 22V, a thrust yoke 23V, a circuit substrate 24V, and a stationary bearing portion 27V.

The base member 21V is arranged below the rotary portion 3V, the magnetic disk 12V, and the access mechanism 13V to extend in a direction orthogonal to the center axis 9V. The base member 21V is preferably obtained by casting metal, e.g., aluminum. Alternatively, the base member 21V may be obtained by other methods such as, for example, cutting, pressing, etc. In addition, the base member 21V may be defined by a plurality of members.

The base member 21V preferably includes a cylinder portion 211V, an inner bottom portion 212V, a ring-shaped wall portion 213V, and an outer bottom portion 214V. The inner bottom portion 212V is located below the stator 22V to extend in a ring shape. Moreover, the inner bottom portion 212V is positioned below the outer bottom portion 214V. The cylinder portion 211V extends upward in a cylindrical or substantially cylindrical shape from the radial inner edge portion of the inner bottom portion 212V. The ring-shaped wall portion 213V extends obliquely such that the height thereof becomes larger as the ring-shaped wall portion 213V goes radially outward from the radial outer edge of the inner bottom portion 212V. The outer bottom portion 214V preferably extends further radially outward from the radial outer edge of the ring-shaped wall portion 213V.

The stator 22V, the thrust yoke 23V, the below-mentioned second insulating sheet portion 26V, and a portion of the rotary portion 3V are accommodated at the upper side of the inner bottom portion 212V and at the radial inner side of the ring-shaped wall portion 213V. Thus, the outer bottom portion 214V is arranged at the same height or substantially at the same height as the stator 22V and a portion of the rotary portion 3V. The first region 81V of the circuit substrate 24V is arranged radially outward of the inner bottom portion 212V and the ring-shaped wall portion 213V. For that reason, the stator 22V and the first region 81V do not axially overlap with each other. Accordingly, the first region 81V can be arranged higher than the bottom surface of the inner bottom portion 212V. This makes it possible to reduce the axial thickness of the spindle motor 11V as a whole.

The stator 22V is an armature which preferably includes a stator core 41V and a plurality of coils 42V. The stator core 41V and the coils 42V are positioned above the inner bottom portion 212V. The stator core 41V is preferably defined by a steel plate laminate obtained by axially stacking electromagnetic steel plates, e.g., silicon steel plates, one above another. The stator core 41V is fixed to the outer circumferential surface of the cylinder portion 211V. Moreover, the stator core 41V preferably includes a plurality of teeth 411V protruding radially outward. The teeth 411A are preferably arranged at a regular or substantially regular interval in the circumferential direction.

The coils 42V are defined by lead wires wound around the respective teeth 411V. The coils 42V are preferably defined by three lead wires 421V configured to supply three-phase currents therethrough. The end portions of the respective lead wires 421V extend downward from the coils 42V and are preferably led out toward the lower surface of the base member 21V via a base through-hole 51V defined in the inner bottom portion 212V. That is to say, the three lead wires led out toward the lower surface of the base member 21V are electrically connected to the coils 42V corresponding to the respective phases of a three-phase alternating current.

The thrust yoke 23V is a ring-shaped member arranged on the upper surface of the inner bottom portion 212V. The thrust yoke 23V is preferably positioned below the magnet 34V (to be described later). A magnetic attraction force is generated between the thrust yoke 23V and the magnet 34V. Thus, the rotary portion 3V is attracted toward the stationary portion 2V.

The circuit substrate 24V is arranged on the lower surface of the base member 21V. Three land portions 241V including exposed copper foils are preferably arranged on the lower surface of the circuit substrate 24V. The three lead wires 421V led out from the base through-hole 51V are respectively soldered to respective ones of the three land portions 241V. Thus, the circuit substrate 24V and the coils 42V are electrically connected to each other. An electric current which drives the spindle motor 11V is supplied from an external power source to the coils 42V through the circuit substrate 24V.

A flexible printed substrate having flexibility is preferably used as the circuit substrate 24V. Use of the flexible printed substrate makes it possible to arrange the circuit substrate 24V along the irregularities of the lower surface of the base member 21V. Use of the flexible printed substrate also makes it possible to reduce the axial thickness of the circuit substrate 24V as compared with other substrates. Accordingly, it is possible to further reduce the axial thickness of the spindle motor 11V.

The stationary bearing portion 27V includes a sleeve 271V and a cap 272V. The sleeve 271V is arranged around the below-mentioned shaft 31V to axially extend in a cylindrical or substantially cylindrical shape. The lower portion of the sleeve 271V is accommodated radially inward of the cylinder portion 211V of the base member 21V and is preferably fixed to the cylinder portion 211V by, e.g., an adhesive agent. The inner circumferential surface of the sleeve 271V is radially opposed to the outer circumferential surface of the shaft 31V across a gap. The cap 272V closes the lower opening of the sleeve 271V. The sleeve 271V may be alternatively defined by a plurality of members if so desired.

The rotary portion 3V preferably includes a shaft 31V, a hub 32V, a ring-shaped member 33V, and a magnet 34V.

The shaft 31V is located radially inward of the sleeve 271V to extend in the axial direction. The upper end portion of the shaft 31V protrudes above the upper surface of the sleeve 271V.

The hub 32V extends radially outward from the peripheral edge of the upper end portion of the shaft 31V. The inner circumferential portion of the hub 32V is fixed to the upper end portion of the shaft 31V. As shown in FIG. 16, the hub 32V includes a ring-shaped projection 320V protruding downward. The ring-shaped member 33V is fixed to the inner circumferential surface of the ring-shaped projection 320V. The inner circumferential surface of the ring-shaped member 33V is radially opposed to the outer circumferential surface of the sleeve 271V.

The hub 32V preferably includes a first holding surface 321V having a cylindrical or substantially cylindrical shape and a second holding surface 322V extending radially outward from the lower end portion of the first holding surface 321V.

A lubricant is provided between the shaft 31V and the stationary bearing portion 27V, between the hub 32V and the stationary bearing portion 27V, and between the ring-shaped member 33V and the stationary bearing portion 27V. The liquid level of the lubricant is positioned between the sleeve 271V and the ring-shaped member 33V. For example, polyol ester-based oil or diester-based oil is preferably used as the lubricant.

A bearing mechanism 15V is preferably defined by the sleeve 271V and the cap 272V, which are members belonging to the stationary portion 2V; the shaft 31V, the hub 32V and the ring-shaped member 33V, which are members belonging to the rotary portion 3V; and the lubricant which is provided between these members.

The magnet 34V is preferably arranged radially outward of the stator 22V and is fixed to the hub 32V.

In the spindle motor 11V described above, if a drive current is supplied to the coils 42V via the circuit substrate 24V, magnetic flux is generated in the teeth 411V. Then, circumferential torque is generated by the magnetic flux acting between the teeth 411V and the magnet 34V. As a result, the rotary portion 3V is rotated about the center axis 9V with respect to the stationary portion 2V. The magnetic disk 12V supported on the hub 32V is rotated about the center axis 9V together with the rotary portion 3V.

Figure 17:
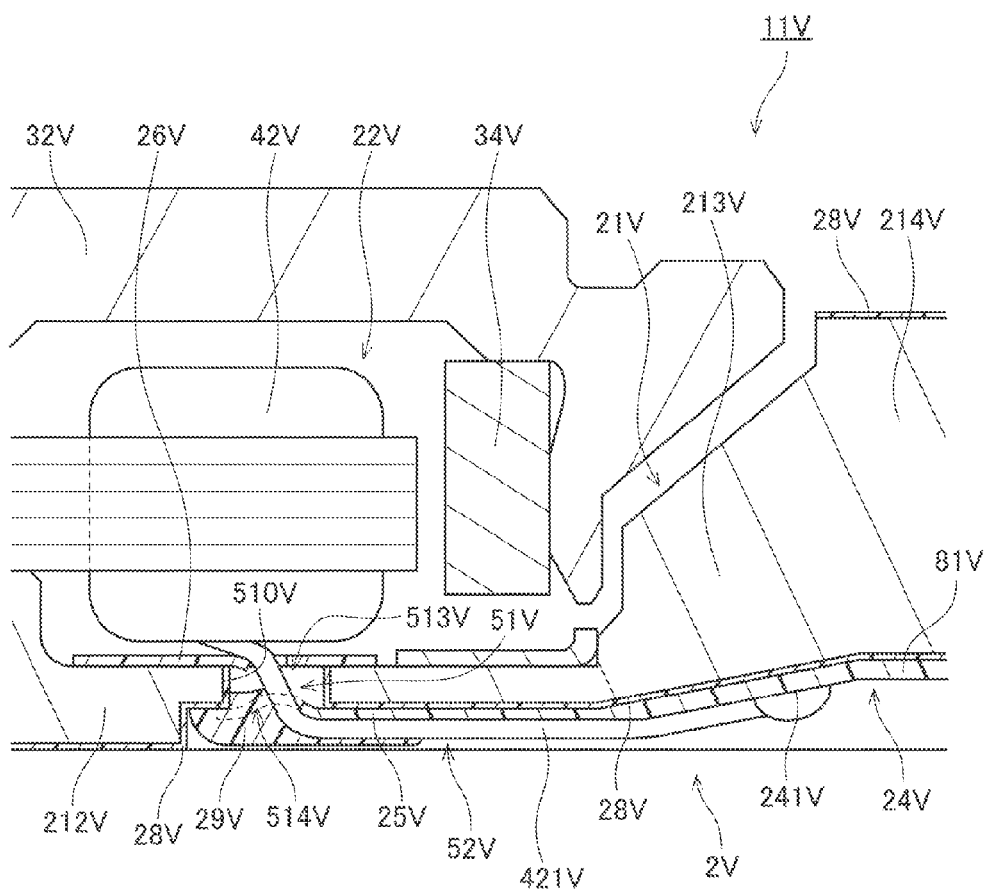
FIG. 17 is a partial vertical sectional view of the spindle motor according to the third preferred embodiment of the present invention.
Figure 18:
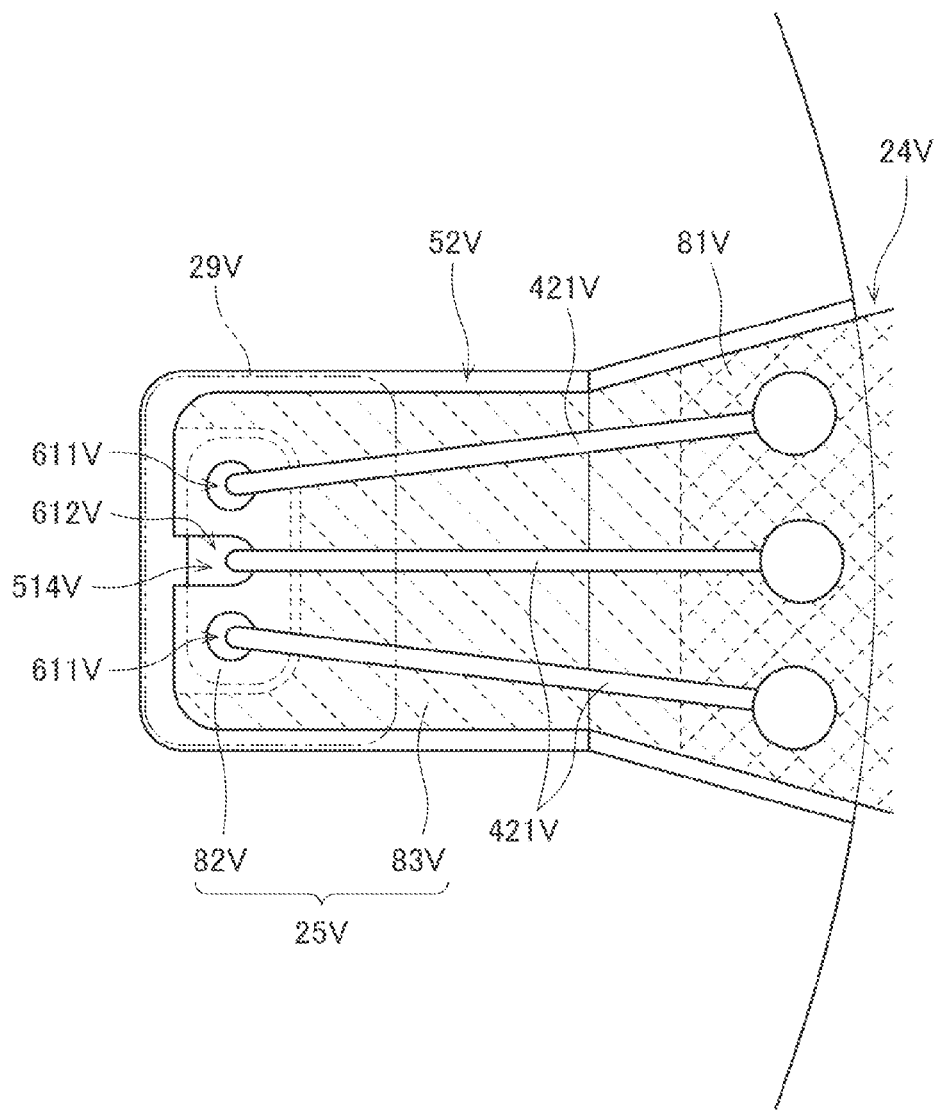
FIG. 18 is a partial bottom view of a base member according to the third preferred embodiment of the present invention.

Next, description will be made on the routes of the lead wires 421V extending from the coils 42V to the land portions 241V. FIG. 17 is a partial sectional view of the spindle motor 11V, which includes each of the routes of the lead wires 421V extending from the coils 42V to the land portions 241V. FIG. 18 is a partial bottom view of the base member 21V, which includes the routes of the lead wires 421V. In FIG. 18, the region of the circuit substrate 24V covered with an adhesive agent 29V is indicated by a double-dot chain line. In the following description, reference will be made to FIG. 16 and, if appropriate, FIGS. 17 and 18.

At least a portion of the surface of the base member 21V is preferably covered with an insulating portion 28V. The insulating portion 28V is preferably formed by electro-coating, e.g., a resin as an electrically insulating material. Alternatively, the insulating portion 28V may be formed by powder coating. As shown in FIG. 17, at least the lower surface of the inner bottom portion 212V, the lower surface of the ring-shaped wall portion 213V, the lower surface of the outer bottom portion 214V, and the upper surface of the outer bottom portion 214V are covered with the insulating portion 28V.

The base member 21V preferably includes a base through-hole 51V. The base through-hole 51V is located below the stator 22V to axially extend through the inner bottom portion 212V. That is to say, the base through-hole 51V axially interconnects an upper opening 513V defined at the upper surface side of the inner bottom portion 212V and a lower opening 514V defined at the lower surface side of the inner bottom portion 212V. A tubular surface 510V of the base member 21V defining the base through-hole 51V is preferably covered with the insulating portion 28V. Furthermore, a base groove portion 52V extending in the radial direction is preferably defined on the lower surfaces of the inner bottom portion 212V and the ring-shaped wall portion 213V. The base groove portion 52V protrudes upward and extends radially outward from the lower opening of the base through-hole 51V. In other words, the lower opening 514V of the base through-hole 51V is opened into the base groove portion 52V. The bottom surface and the wall surfaces defining the base groove portion 52V are preferably covered with the insulating portion 28V.

Figure 19:
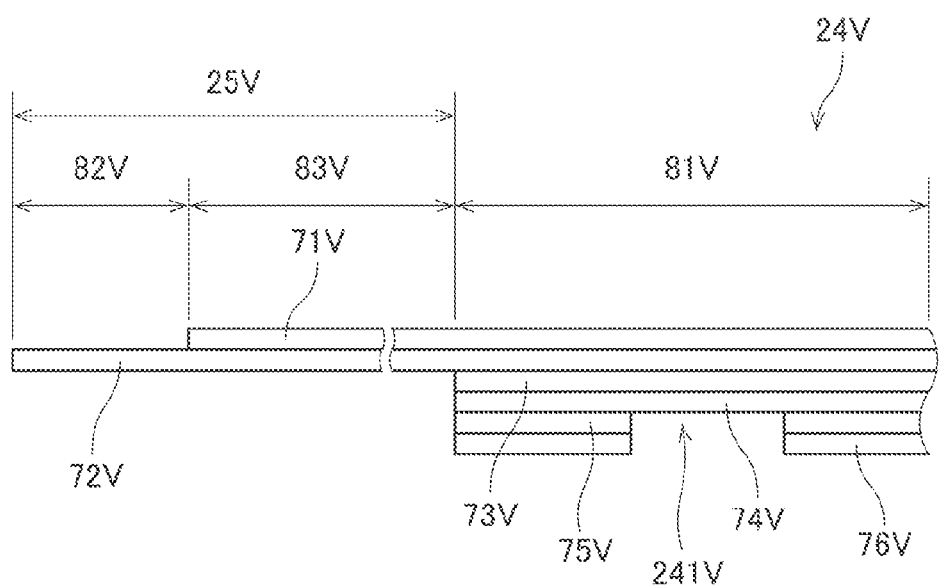
FIG. 19 is a partial vertical sectional view of a circuit substrate according to the third preferred embodiment of the present invention.

FIG. 19 is a partial vertical sectional view of the circuit substrate 24V. As shown in FIG. 19, the circuit substrate 24V preferably includes a first adhesive layer 71V, an insulating material layer 72V, a second adhesive layer 73V, a copper foil layer 74V, a third adhesive layer 75V, and a cover layer 76V. These six layers 71V to 76V are axially laminated one above another. An adhesive agent or an adhesive material is preferably used as the first adhesive layer 71V, the second adhesive layer 73V and the third adhesive layer 75V. A resin such as polyimide or the like, which is an electrically insulating material, is preferably used as the insulating material layer 72V and the cover layer 76V. A copper foil, which is a conductor, is preferably used as the copper foil layer 74V.

The circuit substrate 24V is fixed to the lower surface of the base member 21V by the first adhesive layer 71V. Thus, the lower surface of the base member 21V and the upper surface of the first adhesive layer 71V contact each other. The insulating material layer 72V is in contact with the first adhesive layer 71V and is disposed below the first adhesive layer 71V. The second adhesive layer 73V, the copper foil layer 74V, the third adhesive layer 75V and the cover layer 76V are disposed below the insulating material layer 72V in the named order. The lower surface of the insulating material layer 72V and the upper surface of the copper foil layer 74V are fixed to each other by the second adhesive layer 73V. The lower surface of the copper foil layer 74V and the upper surface of the cover layer 76V are fixed to each other by the third adhesive layer 75V.

As shown in FIGS. 18 and 19, the circuit substrate 24V preferably includes a first region 81V, a second region 82V, and an intermediate region 83V. The second region 82V and the intermediate region 83V are disposed along the bottom surface of the base groove portion 52V. The first region 81V is positioned more radially outward than the second region 82V and the intermediate region 83V. In FIG. 18, the first region 81V is cross-hatched with broken lines. The intermediate region 83V is hatched by broken lines. The second region 82V is not hatched. The first region 81V, the second region 82V and the intermediate region 83V are included in a one-piece circuit substrate 24V.

The first region 81V preferably includes all the layers 71V to 76V described above. The first adhesive layer 71V included in the first region 81V is one example of a "substrate adhesive layer". The insulating material layer 72V included in the first region 81V is one example of a "substrate insulating material layer". The three land portions 241V mentioned above are included in the first region 81V. In the land portions 241V, the lower surface of the copper foil layer 74V is exposed through the openings defined in the cover layer 76V. The lead wires 421V led out from the coils 42V are soldered to the exposed copper foil layer 74V of the land portions 241V.

The second region 82V and the intermediate region 83V of the circuit substrate 24V define a first insulating sheet portion 25V. The first insulating sheet portion 25V prevents the lead wires 421V from contacting the lower surface of the base member 21V. The first insulating sheet portion 25V preferably includes a smaller number of layers than the first region 81V of the circuit substrate 24V. As shown in FIG. 19, the second region 82V is defined by only the insulating material layer 72V. The intermediate region 83V is defined by two layers, namely the first adhesive layer 71V and the insulating material layer 72V. In other words, the intermediate region 83V is defined by a smaller number of layers than the first region 81V and a larger number of layers than the second region 82V. The first adhesive layer 71V included in the intermediate region 83V is one example of a "sheet portion adhesive layer". The insulating material layer 72V included in the intermediate region 83V and the second region 82V is one example of a "sheet portion insulating material layer".

As shown in FIG. 18, the second region 82V preferably covers at least a portion of the lower opening 514V of the base through-hole 51V. The second region 82V is preferably a little wider than the lower opening 514V. Thus, when seen in a bottom view, the second region 82V includes a portion which covers the lower opening 514V and a portion which covers the lower surface of the base member 21V. The intermediate region 83V is preferably fixed to the lower surface of the base member 21V between the first region 81V and the second region 82V.

The second region 82V preferably includes a pair of through hole portions 611V and a cutout portion 612V. When seen in a bottom view, the through hole portions 611V axially extend through the insulating material layer 72V at the positions where the through hole portions 611V overlap with the lower opening 514V of the base through-hole 51V. The through hole portions 611V are disposed in a circumferentially spaced-apart relationship. The cutout portion 612V is preferably positioned between the through hole portions 611V. The cutout portion 612V axially extends through the insulating material layer 72V and is opened radially inward. The diameter of the through hole portions 611V and the width of the cutout portion 612V are larger than the diameter of the lead wires 421V.

The three lead wires 421V are arranged to pass through the through hole portions 611V and the cutout portion 612V in a one-to-one correspondence. The three lead wires 421V are led into the base groove portion 52V while contacting the insulating material layer 72V which defines the second region 82V.

The second region 82V of the circuit substrate 24V is preferably not provided with the first adhesive layer 71V and, therefore, is not fixed to the lower surface of the base member 21V. However, at the circumferential opposite sides of the lower opening 514V, the intermediate region 83V is fixed to the lower surface of the base member 21V by the first adhesive layer 71V. Thus, the bending of the second region 82V is restrained. Accordingly, even if the lead wires 421V make contact with the second region 82V of the circuit substrate 24V when the lead wires 421V extend from the coils 42V, the second region 82V is not largely bent. For that reason, the lead wires 421V can easily pass through the through hole portions 611V and the cutout portion 612V.

A second insulating sheet portion 26V is disposed on the upper surface of the inner bottom portion 212V. The second insulating sheet portion 26V is preferably fixed to the upper surface of the inner bottom portion 212V by, e.g., an adhesive agent or an adhesive material. A resin, e.g., polyethylene terephthalate (PET), which is an electrically insulating material, is preferably used as the material of the second insulating sheet portion 26V.

The second insulating sheet portion 26V is preferably provided between the inner bottom portion 212V and the coils 42V. Thus, the base member 21V and the coils 42V are prevented from making contact with each other. The second insulating sheet portion 26V allows the inner bottom portion 212V and the coils 42V to come close to each other in the axial direction. This makes it possible to further reduce the axial thickness of the spindle motor 11V.

As shown in FIG. 17, the three lead wires 421V extending from the coils 42V extend into the base through-hole 51V from the position at the upper side of the inner bottom portion 212V and at the radial inner side of the center of the base through-hole 51V. At this time, the respective lead wires 421V pass through the upper opening 513V of the base through-hole 51V while contacting the second insulating sheet portion 26V. Furthermore, the three lead wires 421V are led into the base groove portion 52V through the through hole portions 611V or the cutout portion 612V of the circuit substrate 24V. At this time, the respective lead wires 421V pass through the lower opening 514V of the base through-hole 51V while contacting the second region 82V of the circuit substrate 24V. Moreover, the three lead wires 421V extend radially outward along the lower surface of the first insulating sheet portion 25V while contacting the lower surface of the first insulating sheet portion 25V within the base groove portion 52V. Then, the end portions of the respective lead wires 421V reach the first region 81V of the circuit substrate 24V and are connected to the respective land portions 241V by soldering.

As shown in FIGS. 17 and 18, the stationary portion 2V preferably further includes an adhesive agent 29V as a sealing material. The lower opening 514V of the base through-hole 51V is covered with the adhesive agent 29V. This preferably prevents gas from flowing through the base through-hole 51V. As a result, the airtightness of the disk drive apparatus 1V is enhanced. The lead wires 421V are fixed by the adhesive agent 29V. As a consequence, the position shift of the respective lead wires 421V is significantly reduced or prevented. Moreover, the lead wires 421V are prevented from protruding below the lower surface of the inner bottom portion 212V.

The adhesive agent 29V is preferably disposed not only within the base through-hole 51V but also within the base groove portion 52V. The adhesive agent 29V covers at least a portion of the lower surface of the second region 82V and the lower surface of the intermediate region 83V. This configuration makes it possible to fix the lead wires 421V with the adhesive agent 29V over a wide range thereof. Thus, the lead wires 421V are further restrained from protruding below the lower surface of the inner bottom portion 212V. The lower surface of the first region 81V is not covered with the adhesive agent 29V.

The axial depth of the base groove portion 52V is preferably larger than the total sum of the thickness of the insulating portion 28V, the thickness of the first insulating sheet portion 25V and the coating thickness of the adhesive agent 29V at the lower side of the first insulating sheet portion 25V. Thus, the adhesive agent 29V is prevented from protruding downward from the base groove portion 52V. As a result, the axial thickness of the spindle motor 11V is further reduced.

In the spindle motor 11V, the second region 82V including a small number of layers is disposed in the portion of the circuit substrate 24V overlapping with the lower opening 514V of the base through-hole 51V when seen in a plan view. This makes it possible to cover the lower opening 514V of the base through-hole 51V with the adhesive agent 29V and to reduce the thickness of the second region 82V. As a result, it is possible to reduce the axial thickness of the spindle motor 11V.

The first adhesive layer 71V is preferably not provided at the upper surface side of the second region 82V of the circuit substrate 24V. That is to say, the insulating material layer 72V of the second region 82V directly covers a portion of the lower opening 514V without going through the first adhesive layer 71V. If the first adhesive layer 71V is removed at the upper surface side of the second region 82V in this way, it is possible to further reduce the axial dimension of the spindle motor 11V.

The second adhesive layer 73V is preferably not provided at the lower surface side of the second region 82V and the intermediate region 83V of the circuit substrate 24V. That is to say, the lower surface of the insulating material layer 72V of the second region 82V and the intermediate region 83V directly contacts the adhesive agent 29V without going through the second adhesive layer 73V. If the second adhesive layer 73V is removed at the lower surface side of the first insulating sheet portion 25V in this way, it is possible to further reduce the axial dimension of the spindle motor 11V.

As indicated by a broken line in FIG. 17, the second region 82V of the circuit substrate 24V is preferably slightly bent into the base through-hole 51V as the adhesive agent 29V is coated and cured. This makes it possible to coat an increased amount of adhesive agent 29V at the lower surface side of the second region 82V and to reduce the axial thickness of the spindle motor 11V.

As shown in FIGS. 17 and 18, the second region 82V of the circuit substrate 24V preferably extends across the base through-hole 51V from the radial outer edge portion of the lower opening 514V to the radial inner edge portion of the lower opening 514V. Thus, the second region 82V of the circuit substrate 24V contacts the mutually-opposing edge portions of the lower opening 514V. With this configuration, it is preferably possible to prevent the adhesive agent 29V from flowing from the lower opening 514V into the base through-hole 51V during the coating process of the adhesive agent 29V. This makes it possible to reduce the coating amount of the adhesive agent 29V.

The present invention is not limited to the third preferred embodiment described above.

Figure 20:
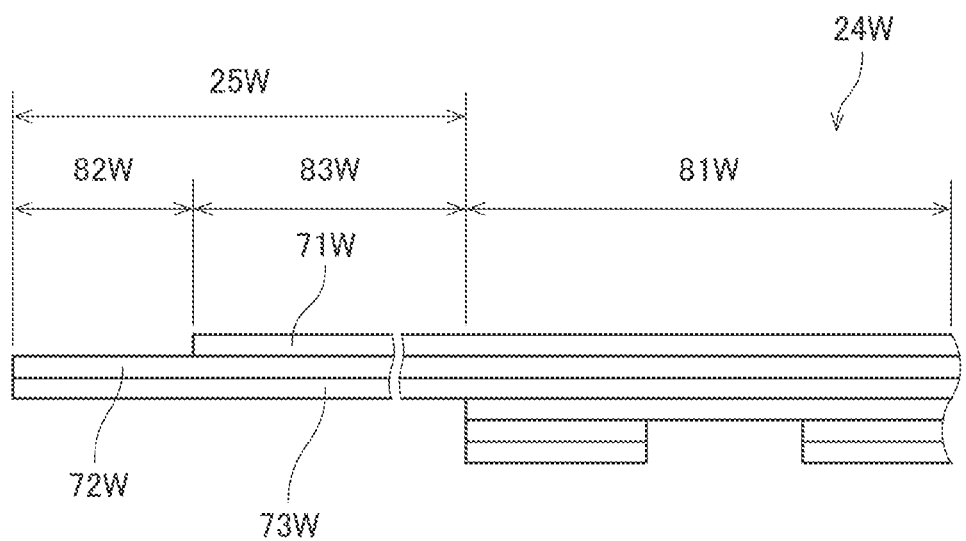
FIG. 20 is a partial vertical sectional view of a circuit substrate according to a modified example of a preferred embodiment of the present invention.

FIG. 20 is a partial vertical sectional view of a circuit substrate 24W according to a modified example of a preferred embodiment of the present invention. In the example shown in FIG. 20, the second adhesive layer 73W extends to the radial inner end portion of the circuit substrate 24W. Thus, the second region 82W is defined by two layers, namely the insulating material layer 72W and the second adhesive layer 73W. The intermediate region 83W is defined by three layers, namely the first adhesive layer 71W, the insulating material layer 72W and the second adhesive layer 73W. Since the first insulating sheet portion 25W including the second region 82W is defined by a smaller number of layers than the first region 81W, it is possible to reduce the axial dimension of the spindle motor.

Figure 21:
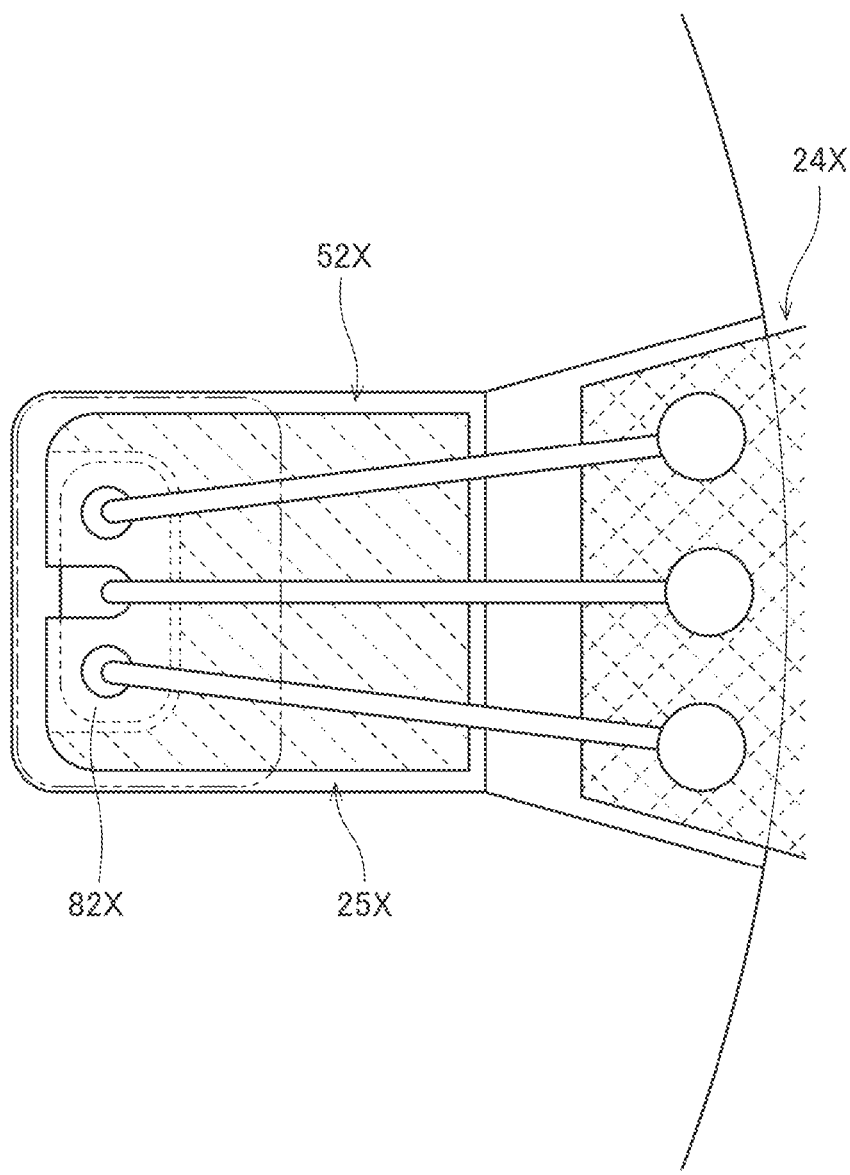
FIG. 21 is a partial bottom view of a spindle motor according to the modified example.

FIG. 21 is a partial bottom view of a spindle motor according to another modified example of a preferred embodiment of the present invention. In the example shown in FIG. 21, the circuit substrate 24X and the first insulating sheet portion 25X are preferably mutually independent portions. That is to say, the first insulating sheet portion 25X, which is different and separate from the circuit substrate 24X, is disposed within the base groove portion 52X defined on the lower surface of the base member. A resin, e.g., polyethylene terephthalate (PET), which is an electrically insulating material, is used as the material of the first insulating sheet portion 25X. The first insulating sheet portion 25X is preferably fixed to the bottom surface of the base groove portion 52X by an adhesive agent or an adhesive material. Since the first insulating sheet portion 25X including the second region 82X is defined by a smaller number of layers than the circuit substrate 24X in this configuration, it is possible to reduce the axial dimension of the spindle motor.

Figure 22:
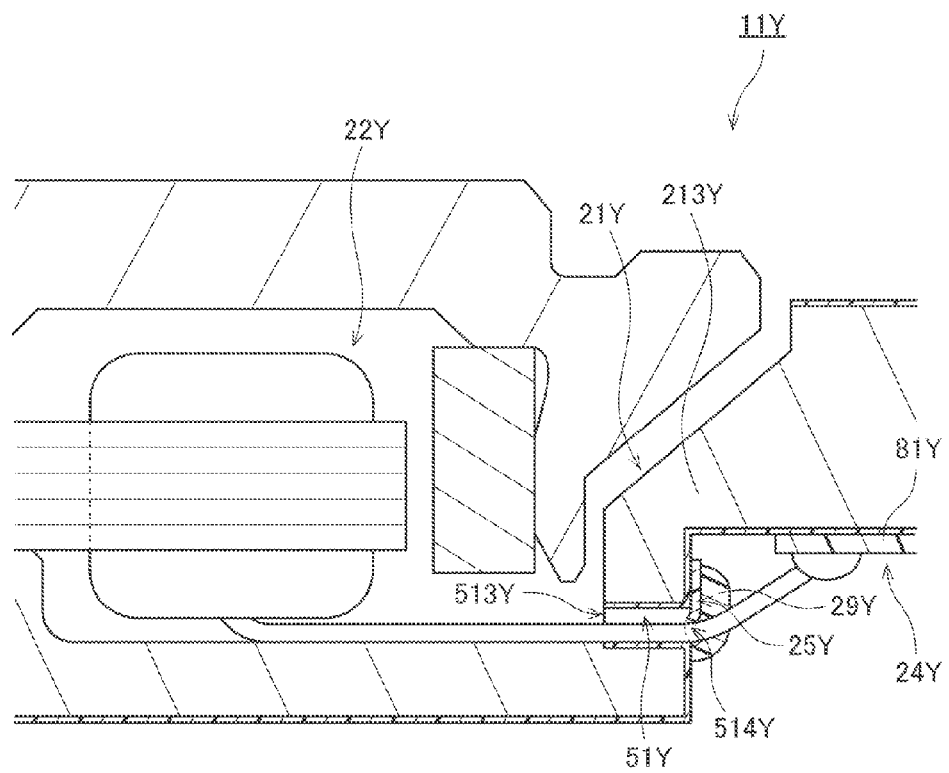
FIG. 22 is a partial vertical sectional view of the spindle motor according to the modified example.

FIG. 22 is a partial vertical sectional view of a spindle motor 11Y according to a further modified example of a preferred embodiment of the present invention. In the example shown in FIG. 22, the base through-hole 51Y is not defined in the ring-shaped wall portion 213Y of the base member 21Y. The base through-hole 51Y is positioned more radially outward than the stator 22Y so as to radially pass through the ring-shaped wall portion 213Y. That is to say, the base through-hole 51Y preferably interconnects the upper opening 513Y and the lower opening 514Y. The upper opening 513Y is defined on the radial inner surface of the ring-shaped wall portion 213Y at the upper surface side of the base member 21Y. The lower opening 514Y is defined on the radial outer surface of the ring-shaped wall portion 213Y at the lower surface side of the base member 21Y. The lower opening 514Y of the base through-hole 51Y is at least partially covered with the first insulating sheet portion 25Y. Furthermore, the lower opening 514Y of the base through-hole 51Y is preferably covered with the adhesive agent 29Y as a sealing material. If the first insulating sheet portion 25Y is defined by a smaller number of layers than the first region 81Y of the circuit substrate 24Y, it is possible to reduce the dimension of the spindle motor 11Y in the vicinity of the base through-hole 51Y.

In the third preferred embodiment, the through hole portions 611V and the cutout portion 612V are defined in the second region 82V of the circuit substrate 24V. However, the present invention is not limited thereto. For example, the through hole portions 611V shown in FIG. 18 may be replaced by a pair of cutout portions and the cutout portion 612V shown in FIG. 18 may be replaced by a through hole portion. That is to say, one through hole portion may be disposed between a pair of cutout portions. In addition, three through hole portions may be defined in the second region and the lead wires may be allowed to pass through the respective through hole portions in an one-to-one correspondence. Moreover, three cutout portions may be defined in the second region and the lead wires may be allowed to pass through the respective cutout portions in an one-to-one correspondence. The shape of the cutout portion may be a "V" shape or a rectangular shape as well as the "U" shape shown in FIG. 18.

The entirety of the lower opening of the base through-hole may be covered with the second region. For example, three cross-shaped slits may be defined in the second region. In this case, the lead wires extending from the coils may be led out while expanding the slits of the second region.

In the third preferred embodiment, three lead wires preferably extend from the coils through the base through-hole. However, the number of the lead wires led out toward the lower surface of the base member may be one, two, or four or more.

In the third preferred embodiment, the adhesive agent 29V is preferably used as the sealing material which covers the lower opening 514V of the base through-hole 51V. However, other sealing materials may alternatively be used in place of the adhesive agent 29V. For example, a resin material other than the adhesive agent may be used as the sealing material.

In the second preferred embodiment and the respective modified examples thereof, the insulating portion is preferably installed between the first insulating sheet portion and the inner bottom portion. However, the present invention is not limited thereto. For example, the insulating portion may be omitted as long as the contact between the lead wires and the base member can be prevented by the first insulating sheet portion.

The spindle motor can be applied to different kinds of disk drive apparatuses. The disk drive apparatus may be the one that rotates a disk other than the magnetic disk, e.g., an optical disk. The disk drive apparatus can be made thinner in the axial direction. Accordingly, various preferred embodiments of the present invention are particularly useful in a spindle motor included in a disk drive apparatus for a thin notebook-type PC or a tablet-type PC, for example.

In the aforementioned preferred embodiments and modifications thereof, description has been made of a so-called shaft rotating type motor in which a sleeve belongs to a stationary portion with a shaft belonging to a rotary portion. However, the motor may be a so-called shaft fixing type motor in which a shaft belongs to a stationary portion with a sleeve belonging to a rotary portion.

The specific shapes of the respective components may differ from those shown in the respective figures of the subject application. The respective components of the preferred embodiments and the modified examples described above may be appropriately combined unless a conflict arises.

The preferred embodiments of present invention and the modifications thereof can find applications in a spindle motor and a disk drive apparatus.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A spindle motor, comprising:
a stationary portion; and
a rotary portion rotatably supported so as to rotate about a center axis extending up and down; wherein
the stationary portion includes a metal base member, an armature positioned above the base member, and a circuit substrate positioned on a lower surface of the base member and electrically connected to coils of the armature;
the rotary portion includes a magnet configured to generate torque between the magnet and the armature;
the base member includes a base through-hole configured to interconnect an upper opening defined at an upper surface side of the base member and a lower opening defined at a lower surface side of the base member;

an insulating sheet portion, which is different and separate from the circuit substrate or a portion of the circuit substrate, is disposed at the lower surface side of the base member;

the insulating sheet portion covers at least a portion of the lower opening of the base through-hole;

lead wires extending from the coils extend to the lower surface side of the base member through the base through-hole, the lead wires extending radially outward along a lower surface of the insulating sheet portion while contacting the insulating sheet portion, and the lead wires are soldered to land portions of the circuit substrate;

the stationary portion further includes a sealing material covering the lower opening of the base through-hole;

the circuit substrate includes a first region defined by a plurality of layers axially laminated one above another; and the insulating sheet portion includes a smaller number of layers than the first region.

2. The spindle motor of claim 1, wherein
the first region includes a substrate adhesive layer contacting the base member, a substrate insulating material layer contacting the substrate adhesive layer and disposed beneath the substrate adhesive layer, and a copper foil layer disposed beneath the substrate insulating material layer;

the insulating sheet portion includes a sheet portion adhesive layer contacting the base member, and a sheet portion insulating material layer contacting the substrate adhesive layer and disposed beneath the substrate adhesive layer; and the sheet portion insulating material layer directly covers at least a portion of the lower opening.

3. The spindle motor of claim 2, wherein the insulating sheet portion is bent into the base through-hole.

4. The spindle motor of claim 1, wherein the lower surface of the insulating sheet portion directly contacts the sealing material.

5. The spindle motor of claim 1, wherein the insulating sheet portion includes a second region which covers at least a portion of the lower opening of the base through-hole, and an intermediate region fixed to the lower surface of the base member and including a smaller number of layers than the first region and a larger number of layers than the second region.

6. The spindle motor of claim 5, wherein the intermediate region includes a sheet portion adhesive layer contacting the base member, and a sheet portion insulating material layer contacting the sheet portion adhesive layer and disposed beneath the sheet portion adhesive layer.

7. The spindle motor of claim 6, wherein the sealing material covers at least a portion of a lower surface of the second region and a lower surface of the intermediate region and does not cover a lower surface of the first region.

8. The spindle motor of claim 6, wherein the intermediate region is fixed to the base member by the sheet portion adhesive layer at circumferential opposite sides of the lower opening.

9. The spindle motor of claim 6, wherein the second region includes a portion which covers a portion of the lower opening and a portion which covers the lower surface of the base member.

10. The spindle motor of claim 5, wherein the second region includes a portion which covers a portion of the lower opening and a portion which covers the lower surface of the base member.

11. The spindle motor of claim 1, wherein the circuit substrate is a one-piece substrate which includes the first region and the insulating sheet portion.

12. The spindle motor of claim 1, wherein the first region and the insulating sheet portion are independent members.

13. The spindle motor of claim 1, wherein
the base member includes a ring-shaped bottom portion positioned below the armature;
the base through-hole axially extends through the ring-shaped bottom portion; and
at least a portion of the insulating sheet portion overlaps the lower opening of the base through-hole when seen in a plan view.

14. The spindle motor of claim 1, wherein
the base member includes a ring-shaped bottom portion positioned below the armature, and a ring-shaped wall portion extending upward from a radial outer edge portion of the ring-shaped bottom portion; and
the base through-hole extends through the ring-shaped wall portion.

15. The spindle motor of claim 1, wherein the insulating sheet portion is bent into the base through-hole.

16. The spindle motor of claim 15, wherein
the insulating sheet portion includes at least one cutout portion opened radially inward; and
at least one of the lead wires extends to a lower surface side of the circuit substrate through the base through-hole and the cutout portion.

17. The spindle motor of claim 1, wherein the insulating sheet portion contacts mutually-opposing edge portions of the lower opening.

18. The spindle motor of claim 1, wherein
the base member further includes a base groove portion disposed on the lower surface of the base member and depressed upward, the base groove portion extending radially outward from the lower opening of the base through-hole; and
the circuit substrate is disposed along a bottom surface of the base groove portion.

19. A disk drive apparatus, comprising:
the spindle motor of claim 1;
an access mechanism configured to perform at least one of information reading and writing tasks with respect to a disk supported on the rotary portion of the spindle motor; and
a housing configured to accommodate the spindle motor and the access mechanism.

* * * * *